United States Patent [19]
Hajma

[11] Patent Number: 5,309,956
[45] Date of Patent: May 10, 1994

[54] SYSTEM FOR PUNCTURING AEROSOL CANS, COLLECTING LIQUID CONTENTS, AND FILTERING ENVIRONMENTALLY OBJECTIONABLE CONSTITUENTS FROM RELEASED GASES

[76] Inventor: Louis G. Hajma, 24800 Emery Rd., Warrensville Hts., Ohio 44128

[21] Appl. No.: 73,801

[22] Filed: Jun. 9, 1993

[51] Int. Cl.[5] .................. B65B 31/00; B67B 7/24
[52] U.S. Cl. ............................... 141/7; 141/1; 141/51; 141/65; 141/329; 100/902; 100/104; 29/801; 222/83.5; 222/87; 222/83
[58] Field of Search .............. 141/1, 7, 65, 51, 98, 141/329, 330, 97, 89–92; 100/902, 104; 29/403.1, 403.3, 426.1, 426.3, 426.4, 426.5, 801; 222/80, 81, 83, 83.5, 87; 422/900

[56] References Cited

U.S. PATENT DOCUMENTS

| | | | |
|---|---|---|---|
| Re. 33,799 | 1/1992 | Gold et al. | 141/51 |
| 3,303,968 | 2/1967 | Compere | 222/82 |
| 3,333,735 | 8/1967 | Odasso | 222/5 |
| 3,438,548 | 4/1969 | Ceyba | 222/80 |
| 3,620,414 | 11/1971 | Phillips | 222/5 |
| 3,834,589 | 9/1974 | Morane et al. | 222/80 |
| 4,319,697 | 3/1982 | De Barth | 222/80 |
| 4,349,054 | 9/1982 | Chipman et al. | 141/1 |
| 4,407,341 | 10/1983 | Feldt et al. | 141/97 |
| 4,459,906 | 7/1984 | Cound et al. | 100/45 |
| 4,500,015 | 2/1985 | Penney | 222/83.5 |
| 4,690,180 | 9/1987 | Gold | 141/51 |
| 4,934,055 | 6/1990 | Chambers | 30/366 |
| 4,944,333 | 7/1990 | Gold et al. | 141/51 |
| 5,067,529 | 11/1991 | Gonzalez-Miller et al. | 141/7 |
| 5,086,814 | 2/1992 | Sato et al. | 141/65 |
| 5,088,526 | 2/1992 | Nash | 141/1 |
| 5,114,043 | 5/1992 | Collins, Jr. | 222/86 |
| 5,163,483 | 11/1992 | Eckman | 141/1 |
| 5,163,585 | 11/1992 | Campbell | 222/5 |
| 5,174,344 | 12/1992 | Gonzalez-Miller et al. | 141/65 |
| 5,186,219 | 2/1993 | Gold et al. | 141/51 |

FOREIGN PATENT DOCUMENTS 1607991 10/1970 Fed. Rep. of Germany ........ 141/65

OTHER PUBLICATIONS

"Update: Aerosol Can Disposal," *Aerosol Age*, vol. 36, No. 1, pp. 32–33, Jan. 1991.
"Update: Can Disposal," *Aerosol Age*, vol. 35, No. 11, p. 30 & pp. 44–45, Nov. 1990.
"Aerosolv—Compliance Made Easy," 4 page brochure, Katec, Inc., Virginia Beach, Va. 23454 (at least as early as Mar. 1992).
"Aerosolv & Aerosolv Filter," 2 page brochure, Katec, Inc., Virginia Beach, Va. 23454 (at least as early as Mar. 1992).
"Let Us Take the Pressure Off You," 3 page advertisement, American Gas Products, Inc., Whittier, Calif. 90602 (at least as early as Jan. 1992).

*Primary Examiner*—Ernest G. Cusick
*Attorney, Agent, or Firm*—David A. Burge

[57] ABSTRACT

Aerosol spray cans are positioned one at a time at a workstation by inserting the bottom wall of each can through an appropriately sized centering ring to center the bottom wall relative to an annular seal that engages peripheral portions of the bottom wall to support the can at the workstation. The bottom wall is clamped into sealing engagement with the annular seal by using a lever operated clamping mechanism that is adjustable to accommodate all known standard sizes of aerosol spray cans. The bottom wall is punctured by using a lever operated, rack and pinion driven piercing mechanism that extends a piercing pin through the center opening of the annular seal. Contents that discharge from a pierced can are ducted into a receiving container, a lower portion of which is used to collect liquid contents for environmentally safe disposal. Gaseous contents are drawn out of the upper region of the receiving container and pass through a series of filters to remove environmentally objectionable constituents therefrom before the filtered gas is ducted to a plenum that is maintained at less than atmospheric pressure by a blower that discharges gaseous contents from the plenum for venting to the atmosphere. A flow of ambient air is drawn from the vicinity of the workstation and is ducted into the plenum for discharge so that, if gaseous emissions inadvertently emanate from the vicinity of the workstation, they are quickly entrained in the flow of ambient air and are ducted to the reduced pressure plenum for discharge.

61 Claims, 12 Drawing Sheets

SYSTEM FOR PUNCTURING AEROSOL CANS, COLLECTING LIQUID CONTENTS, AND FILTERING ENVIRONMENTALLY OBJECTIONABLE CONSTITUENTS FROM RELEASED GASES

BACKGROUND OF THE INVENTION

1. Field of the Invention

The present invention relates generally to a system for puncturing pressurized containers such as relatively thin-walled aerosol spray cans, for emptying contents therefrom, for collecting liquid contents for environmentally safe disposal, and for filtering vapor-laden propellant gas to remove environmentally objectionable constituents therefrom so that the remaining gas safely can be vented to atmosphere. In preferred practice, the present invention relates to methods and apparatus features of a system 1) that is capable of being used with all known "standard" sizes of aerosol spray cans, 2) that employs ergonomically designed lever-operated clamping and piercing mechanisms to clamp and pierce bottom walls of aerosol cans that are guide-centered at a workstation, 3) that ducts contents from pierced aerosol cans into a collection receptacle where liquid is retained, 4) that draws vapor-laden propellant gas out of the collection receptacle and through a series of filters before discharging it into a reduced-pressure plenum for eventually being vented to atmosphere, and 5) that entrains in a flow of ambient air that is ducted into the reduced-pressure plenum such gas emissions as may inadvertently emanate from the vicinity of the workstation.

2. Prior Art

Thin-walled pressurized containers such as aerosol spray cans are used in homes and in industry to spray a wide variety of active ingredients such as paint, lubricant, furniture polish, air freshener, deodorant and the like by discharging the active ingredients as a vapor that is entrained in a flow of propellant gas. When the supply of active ingredient carried by an aerosol spray can has been substantially exhausted; when an aerosol spray can fails to properly function in providing a suitable spray-type discharge of active ingredient; and/or when an aerosol spray can is found to be damaged, improperly assembled or inappropriately filled with active ingredient or propellant gas, it is desirable to properly process the aerosol spray can for disposal by safely puncturing the can to relieve the pressure therein, to empty contents therefrom, to collect liquid contents therefrom, and to filter vapor-laden propellant gas before permitting the filtered gas to be released to atmosphere.

To permit a plurality of aerosol cans to be safely punctured and emptied with at least a portion of their contents being collected and/or filtered, a variety of puncturing devices that duct contents to collection receptacles have been proposed. Some of these proposals utilize one or more filters through which gaseous contents emanating from the collection receptacles are permitted to pass before being vented to atmosphere.

While some of these proposals are intended to provide relatively simple, relatively inexpensive manually operable units for piercing aerosol cans, for collecting liquid contents, and for filtering gaseous contents, the proposals made to date tend to be characterized by one or more drawbacks such as a failure to provide a system that is readily adjustable to accommodate all known "standard" sizes of aerosol spray cans, that is ergonomically designed to be easy to operate while processing a plurality of aerosol cans for disposal, that does an effective job of assuring that vapor-laden propellant gas is suitably drawn away from the vicinity of a workstation where cans are punctured, and of filtering environmentally objectionable constituents from released gases.

To the extent that manually operated puncturing units have been proposed that are intended to be mounted atop a lid of an upwardly opening collection container, such proposals typically have been characterized by one or more of the drawbacks mentioned above, and/or by one or more of the drawbacks that are described below.

Some proposals provide a closable chamber into which an aerosol spray can is to be inserted, with the entire interior of the chamber and the entire exterior surface of an aerosol can that is positioned in the closed chamber being subjected to a cloud of liquid, vapor and propellant gas that discharges from the aerosol can when the aerosol can is punctured. Such an arrangement renders quite messy the business of reaching into the chamber to retrieve an emptied aerosol can, and causes unwanted coating of substantially all exterior surfaces of the cans that are to be disposed of, whereby far less than the desired quantity of contents discharged from punctured cans tends to be collected for environmentally appropriate disposal.

Some proposals utilize a poorly supported resilient sealing member both to effect a vapor-tight seal about peripheral portions of the lower part of an aerosol can, and to support the downwardly-clamped aerosol can during a puncturing operation. The substantial loads that are imposed on the resilient sealing member, and the poor manner in which the resilient sealing member is supported combine to contribute to rapid deterioration of the resilient sealing member, whereby its sealing capability tends to be significantly diminished if not entirely defeated after being used to receive, support and seal with a relatively small number of aerosol cans during the time while they are being pierced and emptied.

As more and more small business entities are being called upon to assure that aerosol spray cans are disposed of in an environmentally suitable manner, the long-standing need for a simple to use, relatively inexpensive and reliable system to permit one or more aerosol spray cans to be disposed of from time to time has grown more urgent and has not been found to be satisfactorily addressed by prior proposals.

SUMMARY OF THE INVENTION

The present invention addresses the foregoing and other needs and drawbacks and of the prior art by providing a novel and improved system for puncturing aerosol spray cans, for collecting liquid contents, and for filtering environmentally objectionable constituents from released gases.

In accordance with the preferred practice of the present invention, aerosol spray cans are positioned one at a time at a workstation by inserting the bottom wall of each can through a centering ring that centers the bottom wall relative to an annular seal that engages rim portions of the bottom wall to support the can at the workstation. In preferred practice, a plurality of readily interchangeable centering rings are provided, with each of the centering rings having a tapered inner wall that defines a different inner diameter that will loosely but closely extend about bottom portions of a different diameter of aerosol spray can. By selecting and installing a centering ring having an inner diameter that corresponds to the outer diameter of a next-to-be-punctured aerosol can, each aerosol spray can that is positioned at the workstation is assured of being properly centered to extend upright along an imaginary vertical center axis that passes centrally through the workstation and through the annular seal that is provided at the workstation to engage and support peripheral portions of the bottom walls of aerosol spray cans that are positioned and centered at the workstation.

Once an aerosol can has been properly positioned and centered at the workstation, peripheral portions of its bottom wall are clamped into sealing engagement with the annular seal, preferably by using an adjustable clamping mechanism that will accommodate a variety of sizes of aerosol cans. The adjustable clamping mechanism is a post supported, lever operated assembly that includes a sleeve-shaped clamping member that is moved by pivoting a hand-operated lever to bring the clamping member toward and into engagement with upper end portions of an aerosol can that has been positioned and centered at the workstation. After bringing the sleeve-shaped clamping member into engagement with upper portions of a positioned and centered aerosol can, downward force applied to the hand-operated lever will cause the sleeve-shaped clamping member to exert a downward force on the engaged can to clamp peripheral portions of the can's bottom wall into seated sealing engagement with the upwardly facing seal surface to establish an uninterrupted ring-shaped seal extending along a circular region of engagement between peripheral portions of the bottom wall of the clamped can and the underlying annular seal.

With an aerosol can duly positioned, centered and clamped at the workstation location, a piercing pin is raised along the center axis through a center opening that is defined by the annular seal, and is brought into piercing engagement with the bottom wall of the clamped can to pierce a hole therethrough that permits contents from the can to discharge through the center opening of the annular seal. The piercing pin is retracted after performing each such piercing function so as to not stand as an obstacle to the proper positioning and centering of a next-to-be-punctured can when it is brought into position at the workstation location.

The contents from a punctured can that discharge through the center opening of the annular seal are ducted away from the center opening by a discharge passage that extends initially about the retracted position of the piercing pin for discharging liquid and gaseous contents into a receiving container that preferably underlies the workstation location. Liquid contents are collected in a lower portion of the receiving container for being disposed of in an environmentally appropriate manner that corresponds with suitable environmental guidelines for the handling and disposal of liquid of the character that is collected. Gaseous contents temporarily collect within an upper portion of the receiving container, and are drawn through means for filtering environmentally objectionable contaminants therefrom before the filtered gas is discharged to atmosphere.

The filtering of gaseous contents that are withdrawn from the upper region of the receiving container preferably is performed using a series arrangement of filtering devices. In preferred practice, the first such filtering device that is encountered by gaseous contents withdrawn from the receiving container is a screen filter that extends substantially horizontally across an upwardly directed withdrawal passage through which gaseous contents are removed from the receiving container. It has been found that a screen filter will assist in removing droplets of liquid from the gaseous contents; and, by positioning the screen filter in a passage that extends directly upwardly from the receiving container, at least some of the removed droplets will fall under the influence of gravity into the lower region of the receiving container where liquid contents are being collected. Because the screen filter tends to collect at least some of the removed liquid droplets on its screen surface, a removable cover preferably is provided atop the screen filter to permit periodic access to be had to the location of the screen filter so that the screen filter can be removed and cleaned periodically.

In preferred practice, gaseous contents that have passed through the screen filter preferably are ducted to at least one commercially available filtering unit that contains one or more filter elements that are selected for their ability to filter from gas that is to be discharged to the atmosphere such constituents as would be environmentally objectionable to exhaust into the atmosphere. To assure that a thorough filtering of such gas is effected, it often is desirable to pass the gas through a series of at least two commercially available filtering units so that such gas as passes through these units has been twice filtered to assure that environmentally objectionable constituents have been suitably removed therefrom.

In preferred practice, filtered gas is ducted into a plenum that has its gaseous contents maintained at a pressure that is lower than ambient atmospheric pressure, with the reduced pressure in the plenum being maintained at about five pounds per square inch less than ambient atmospheric pressure. To maintain this reduced pressure, an explosion proof blower preferably is connected to the plenum to draw gaseous contents therefrom for venting such contents to the atmosphere, preferably through an elevated stack or other suitably configured external vent.

As a safeguard to assure that gaseous emissions from contents that discharge from punctured aerosol cans do not rise from the vicinity of the workstation location and flow into the surrounding workplace environment, a wide-mouthed funnel-shaped scoop preferably is positioned in close proximity to the workstation for drawing a flow of ambient air from a region atop the upwardly facing surface of the annular seal. By this arrangement, if gaseous emissions tend to rise from the vicinity of the workstation, they are caused to become entrained in the flow of ambient air, and are ducted with the flow of ambient air into the reduced pressure plenum for venting to the atmosphere with other gaseous contents of the plenum. A flow restriction valve preferably is provided for controlling the rate of flow at which ambient air (and any emissions that may be entrained therein) is withdrawn from the vicinity of the workstation location. By this arrangement, a gentle but effective flow of gas from the vicinity of the workstation location is provided that does not cause gaseous contents that are discharged from punctured cans to backflow through the workstation location, and does not cause an unduly large introduction of ambient air into the reduced pressure plenum.

A safety feature of the preferred practice of the present invention resides in its provision of a pair of ergonomically designed lever-operated mechanisms, one of which is adjustable to accommodate substantially all known "standard" sizes of aerosol spray cans for clamping such cans, one at at time, in place at a workstation, with the other serving to extend and retract a piercing pin to puncture the bottom wall of an aerosol spray can that is suitably centered and clamped in position at the workstation. While these lever-operated mechanisms preferably are operated independently of each other as by using one's right hand to operate the clamping mechanism lever, and by using one's left hand to operate the piercing mechanism lever, the manner in which these lever-operated mechanisms function helps to assures that each is operated in proper sequence. For proper operation, the clamping mechanism needs to be brought into operation to properly clamp an aerosol can in the workstation before the piercing mechanism is brought into operation to pierce the bottom wall of the clamped aerosol can. However, if an operator inadvertently tries to first operate the piercing mechanism (before operating the clamping mechanism), the result will be quite harmless in that, when the piercing mechanism is operated, an "unclamped" aerosol can that is positioned in the workstation will be harmlessly lifted out of its seated position in the workstation, thereby alerting the operator to the error and requiring that the aerosol can be repositioned in the workstation before the two lever-operated mechanisms are again operated.

BRIEF DESCRIPTION OF THE DRAWINGS

These and other features, and a fuller understanding of the present invention may be had by referring to the following description and claims, taken in conjunction with the accompanying drawings, wherein:

DESCRIPTION OF THE PREFERRED EMBODIMENT

Figure 1:
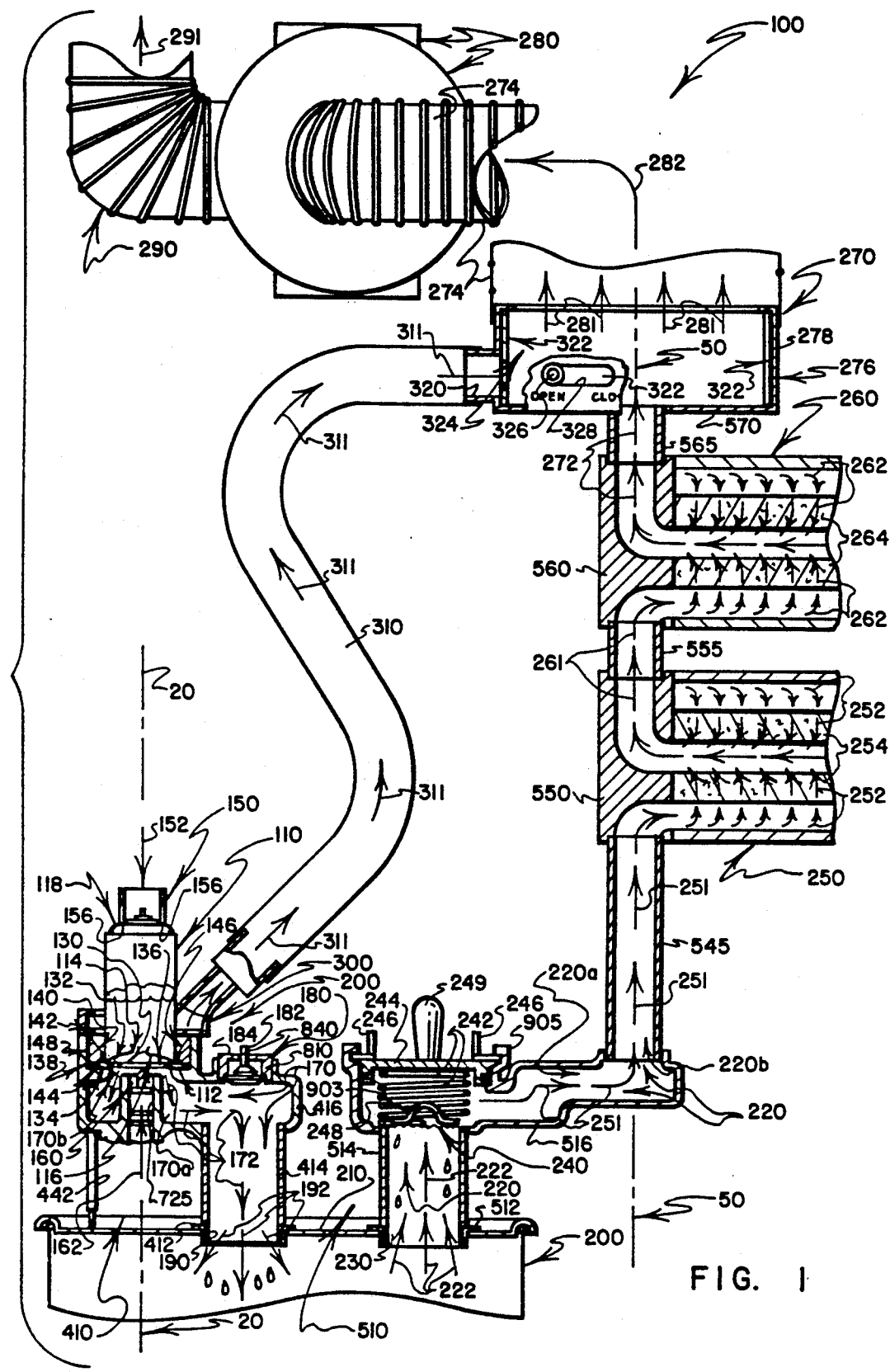
FIG. 1 is a schematic diagram that depicts features of a system that embodies the preferred practice of the present invention, and that utilizes arrows to indicate flow paths and directions of flow along the flow paths of liquid and gaseous contents emptied from an aerosol spray can that is punctured at a workstation.

Referring to FIG. 1, a system for puncturing aerosol spray cans, for collecting liquid contents emptied from punctured aerosol spray cans, and for filtering environmentally objectionable constituents from released propellant gases that embodies the best mode known for carrying out the preferred practice of the present invention is indicated generally by the numeral 100.

In overview, the system 100 utilizes a workstation that is indicated generally by the numeral 120 to receive, center and clamp an upright-oriented aerosol spray can that is indicated generally by the numeral 110. At the workstation 120, a resilient annular seal 130 extends in a substantially horizontal plane so as to provide opposed upwardly and downwardly facing side surfaces 132, 134 that are bounded by an inner diameter surface 136 which is coaxially surrounded by an outer diameter surface 138. The inner and outer diameter surfaces 134, 136 of the annular seal 130 extend substantially coaxially about an imaginary center axis 20 that extends vertically through the center of the workstation 120.

Figure 8:
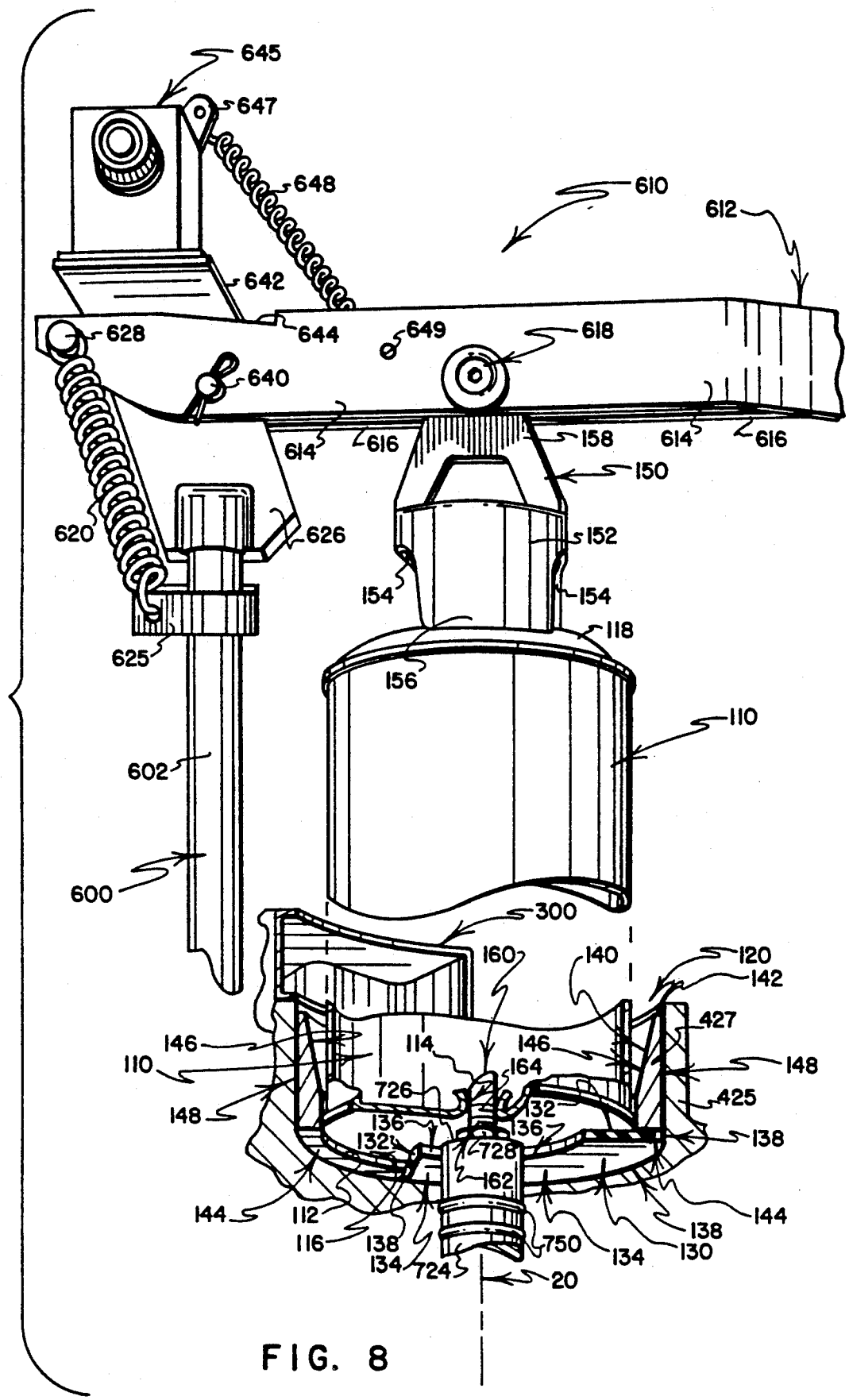
FIG. 8 is a perspective view, on an enlarged scale, showing principally left side portions of selected components of the apparatus.

In preferred practice, a centering ring 140 that has an inner diameter that is appropriate for use with a particular size of aerosol can 110 that is to be punctured at the workstation 120 is selected and is installed atop peripheral portions of the upwardly facing seal surface 132 at the workstation 120. Referring to FIG. 8 (wherein portions of the annular seal 130 and of a selected centering ring 140 are depicted in larger scale), the centering ring 140 has top and bottom surfaces 142, 144 that extend horizontally. The top and bottom surfaces 142, 144 are connected at their outer diameters by a generally cylindrical outer surface 148, and at their inner diameters by an inner surface 146 that is at least partially tapered to serve as a guide in centering an aerosol spray can 110 as the can 110 is lowered into position atop the upwardly facing seal surface 132 at the workstation 120. An aerosol can 110 that is properly positioned at the workstation 120 will be substantially centered about the center axis 20 so that peripherally extending portions 112 of the can's bottom wall 116 are substantially centered atop the upwardly facing seal surface 132.

Figure 6:
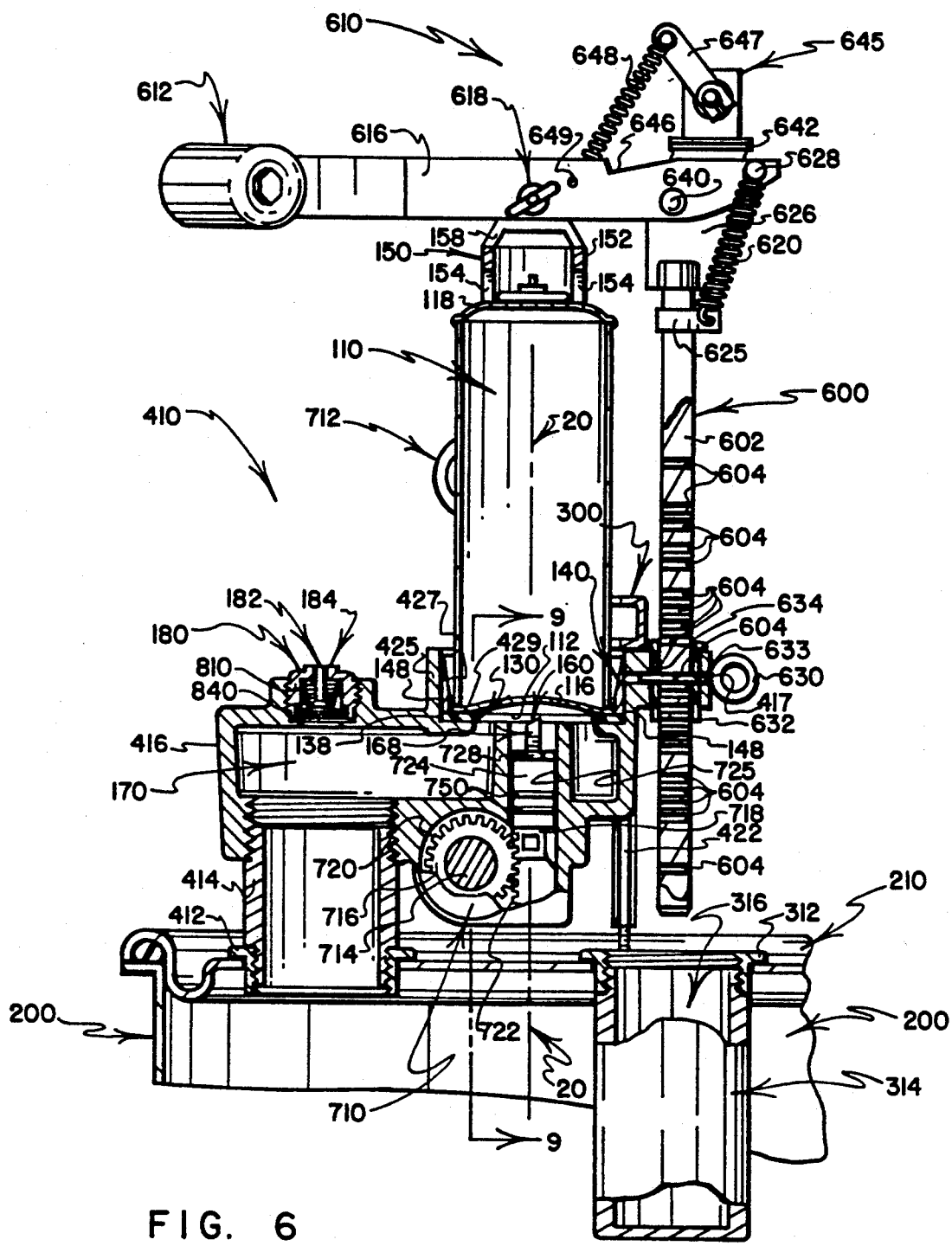
FIG. 6 is an enlargement of a portion of the sectional view of FIG. 4, but with portions of the depicted components broken away to permit otherwise hidden features to be seen, with a relatively large size aerosol spray can shown positioned and centered in a workstation of the apparatus, and with a hand operated lever of a clamping mechanism pivoted downwardly to bring a sleeve-shaped clamping member into engagement with upper portions of the aerosol spray can to clamp lower portions of the can into firm seated engagement with a resilient annular seal that is located at the workstation.
Figure 7:
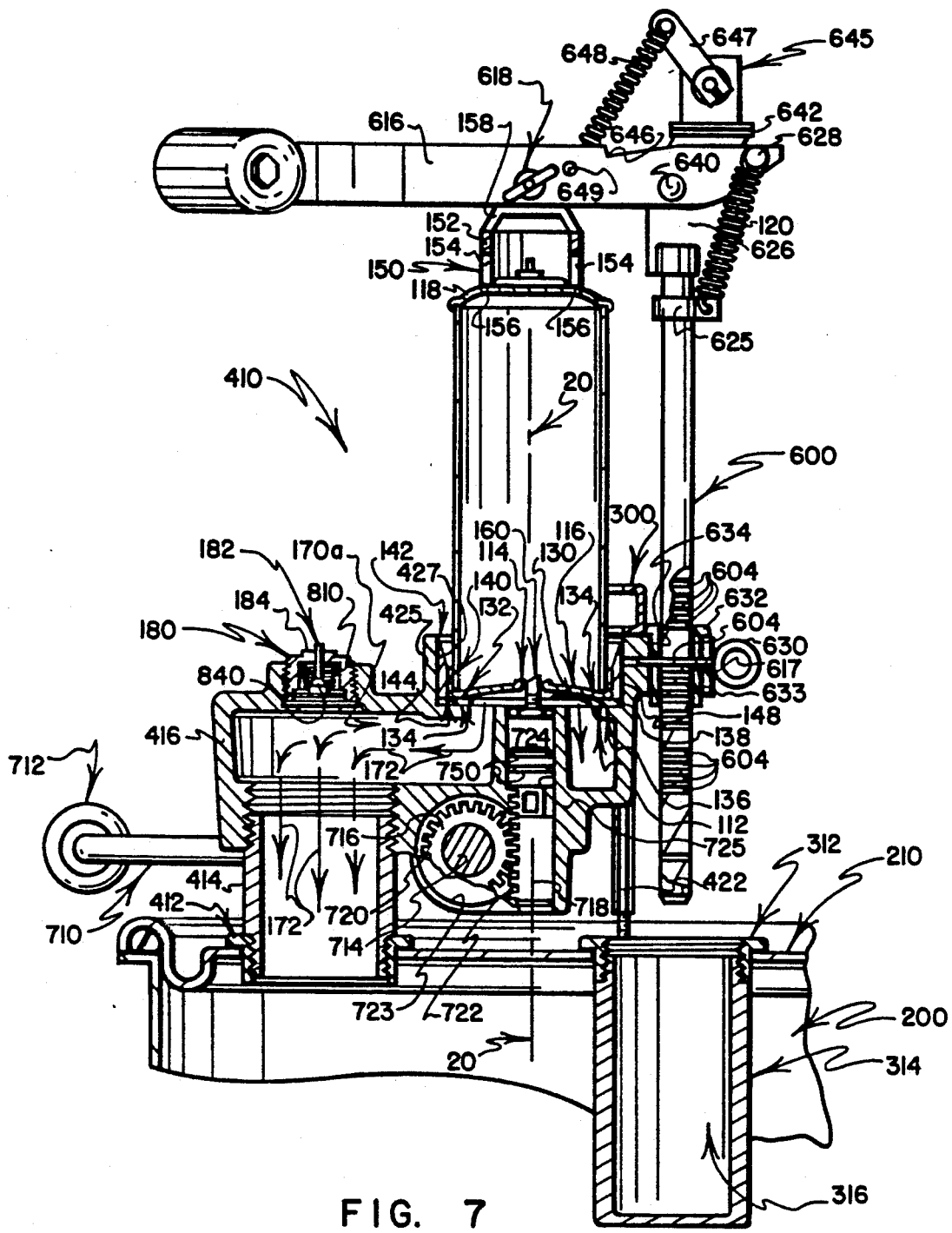
FIG. 7 is a sectional view similar to FIG. 6 but with a hand operated lever of a piercing mechanism pivoted downwardly to raise a piercing pin to puncture the bottom wall of the aerosol spray can and to permit contents of the can to escape through a center opening of the annular seal into a discharge passage through which discharged contents are ducted to an underlying receiving container, and with a pressure responsive visual indicator shown functioning to indicate that a higher-than-ambient-air pressure is present in the discharge passage.
Figure 9:
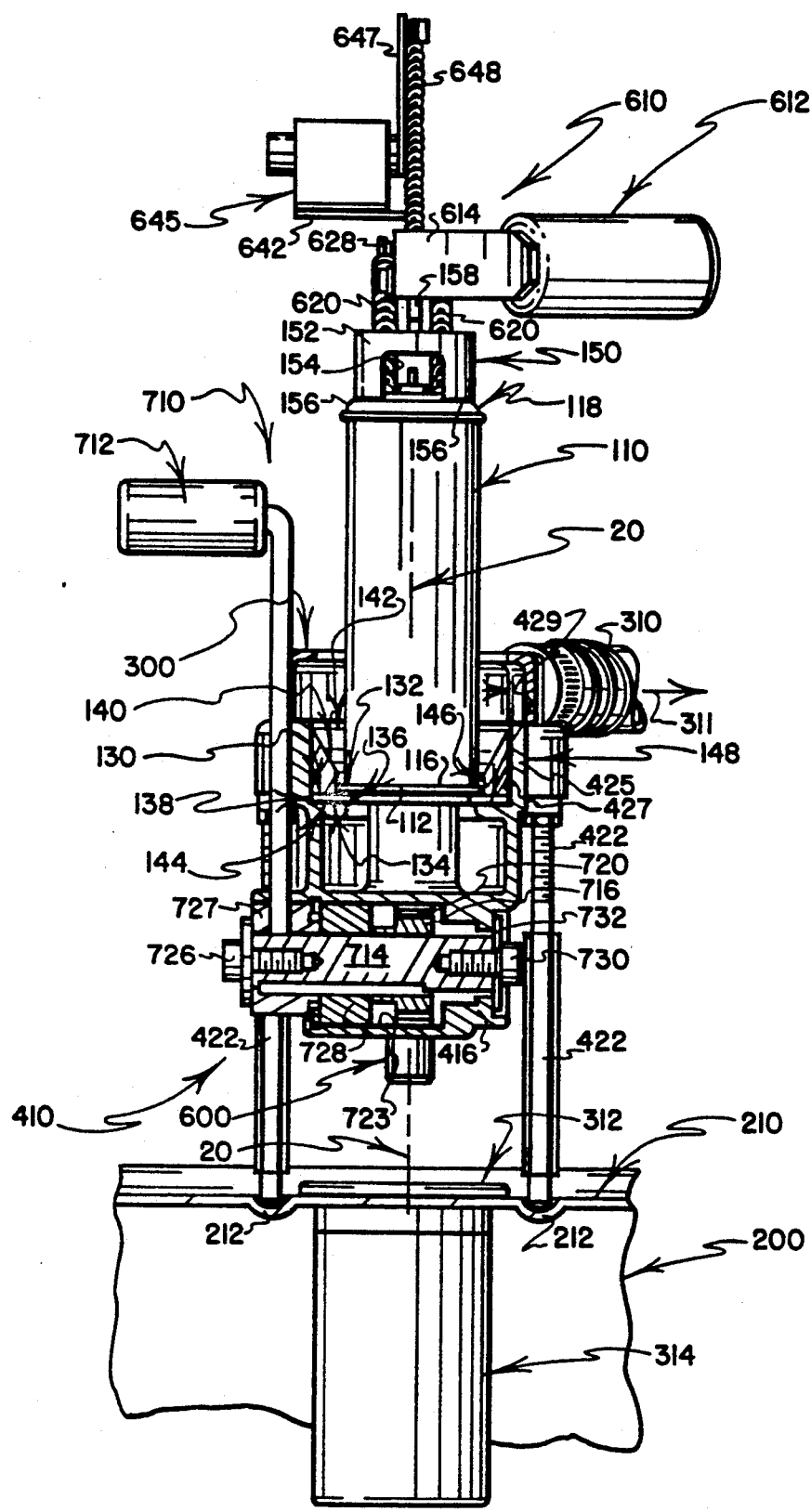
FIG. 9 is a front elevational view showing selected forwardly-located components that were omitted from the front elevational view of FIG. 5, but with the view being drawn to a larger scale, and with portions of some of the depicted components broken away and shown in cross-section as seen from a plane indicated by a line 9—9 in FIG. 6, and with a smaller sized aerosol spray can substituted for the relatively larger sized can that is depicted in FIGS. 6-8.

To accommodate aerosol spray cans of a variety of diameters, the centering ring 140 preferably is selected from among a plurality of such rings that each have a a common outer diameter surface 146 but that have differently configured, partially tapered inner guide surfaces 148 that define different inner diameters, with each of the defined inner diameters of the plurality of centering rings 140 being sized to receive a different diameter of "standard size" aerosol can 110 in a relatively loose fit that will permit its tapered inner surface 146 to guide the correspondingly sized aerosol can into a properly centered position at the workstation 120. Referring, for example, to FIG. 9 wherein a smaller diameter aerosol can 110 is depicted (i.e., it is smaller in diameter than is the aerosol can 110 that is depicted in FIGS. 6–8), it will be seen that a centering ring 140 is positioned atop peripheral portions of the upwardly facing surface 132 of the annular seal 130, with the inner diameter 146 of the depicted centering ring 140 loosely but closely receiving the outer diameter of bottom portions 116 of the depicted aerosol can 110 so as to cooperate therewith in centering the aerosol can 110 about the center axis 20 as the can 110 is moved into position at the workstation 120.

Figure 10:
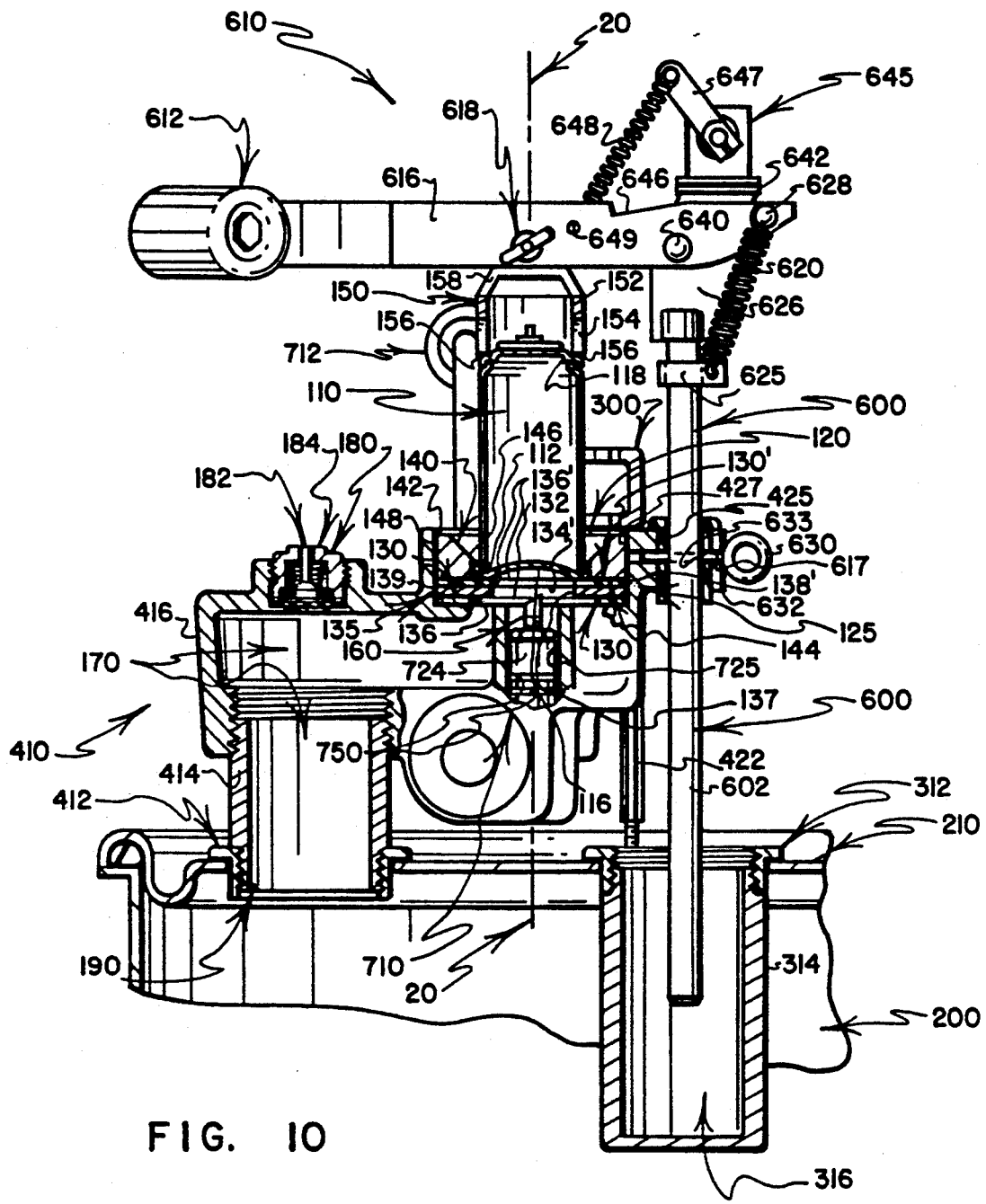
FIG. 10 is a sectional view that is similar to FIG. 6, but showing an unusually small sized aerosol spray can positioned atop an auxiliary seal ring at the workstation of the apparatus.

Referring briefly to FIG. 10 wherein an unusually small sized aerosol can 110 is shown positioned at the workstation 120, because the depicted can 110 has an outer diameter that is smaller than a center opening that is defined by the inner diameter 136 of the annular seal 130, an auxiliary sealing ring assembly 125 is shown installed atop the upper surface 132 of the annular seal 130. The auxiliary sealing ring assembly 125 includes a metal washer 135 that has an inner diameter 137 that is smaller than the outer diameter of the unusually small aerosol can 110 that is depicted in FIG. 10 (and that is smaller than inner diameter 136 of the annular seal 130). The metal washer 135 has an outer diameter 139 that equals the outer diameter 138 of the annular seal 130. Atop the metal washer 135 (and forming a second component part of the auxiliary sealing ring assembly 125) is an auxiliary annular seal 130' that has inner and outer diameters 136', 138' that are sized to correspond to the inner and outer diameters 137, 139 of the underlying metal washer 135. The auxiliary annular seal 130' has a flat bottom surface 134' that overlies the washer 135 (and can be adhered to the washer 135 if desired), and a flat upwardly facing surface 132'. Seated atop the periphery of the upwardly facing surface 132' of the auxiliary annular seal 130' is a centering ring 140 that has an inner diameter 146 that is tapered and sized to guide and center the unusually small aerosol can 110 into position at the workstation 120, with peripheral portions 112 of the bottom wall 116 of the can 110 seated atop the upwardly facing surface 132' of the auxiliary annular seal 130'.

Figure 2:
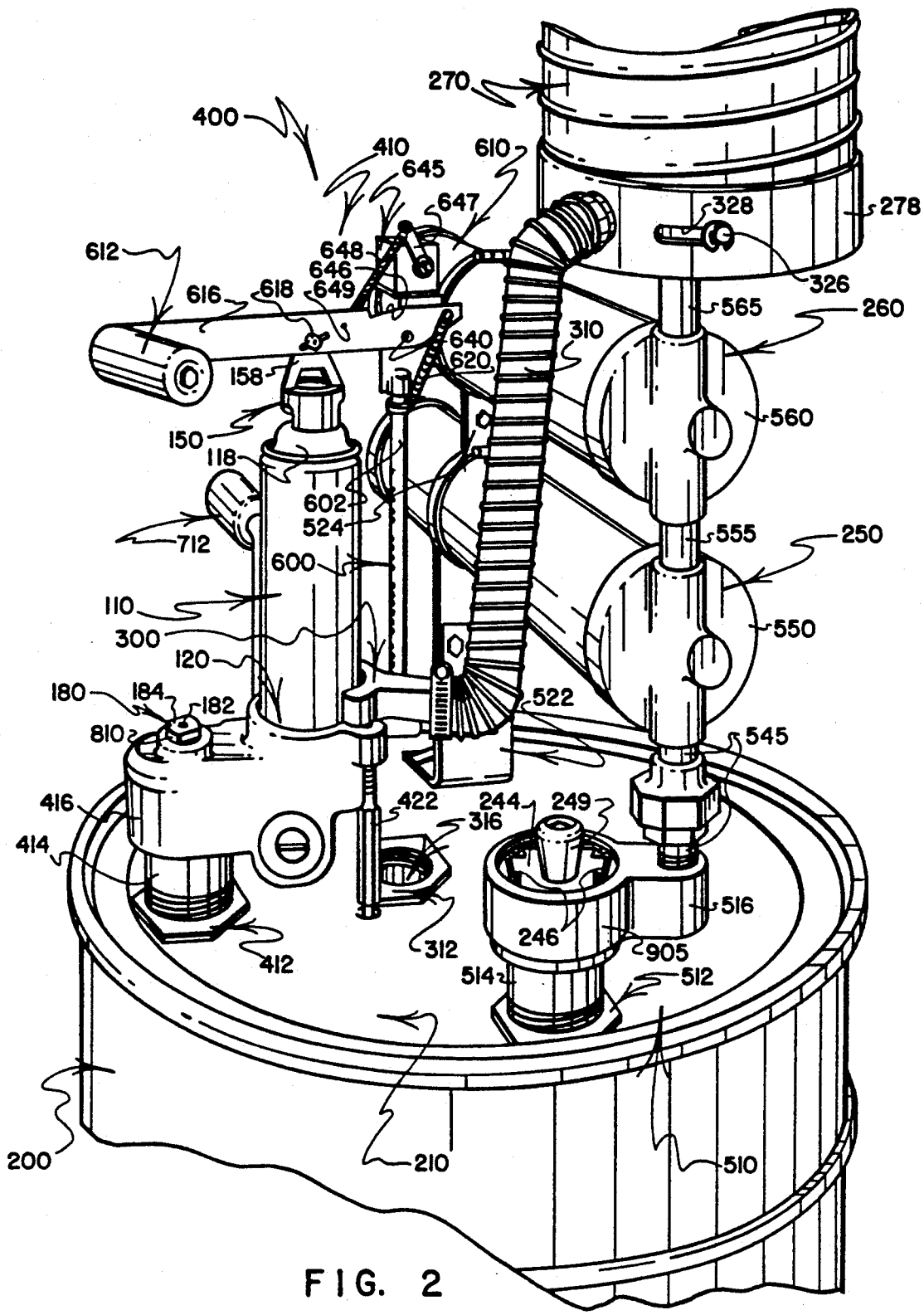
FIG. 2 is a perspective view of an apparatus that preferably is employed in implementing the system of FIG. 1, and that embodies the best mode currently known for carrying out the preferred practice of the present invention, with an aerosol can clamped at a workstation.
Figure 3:
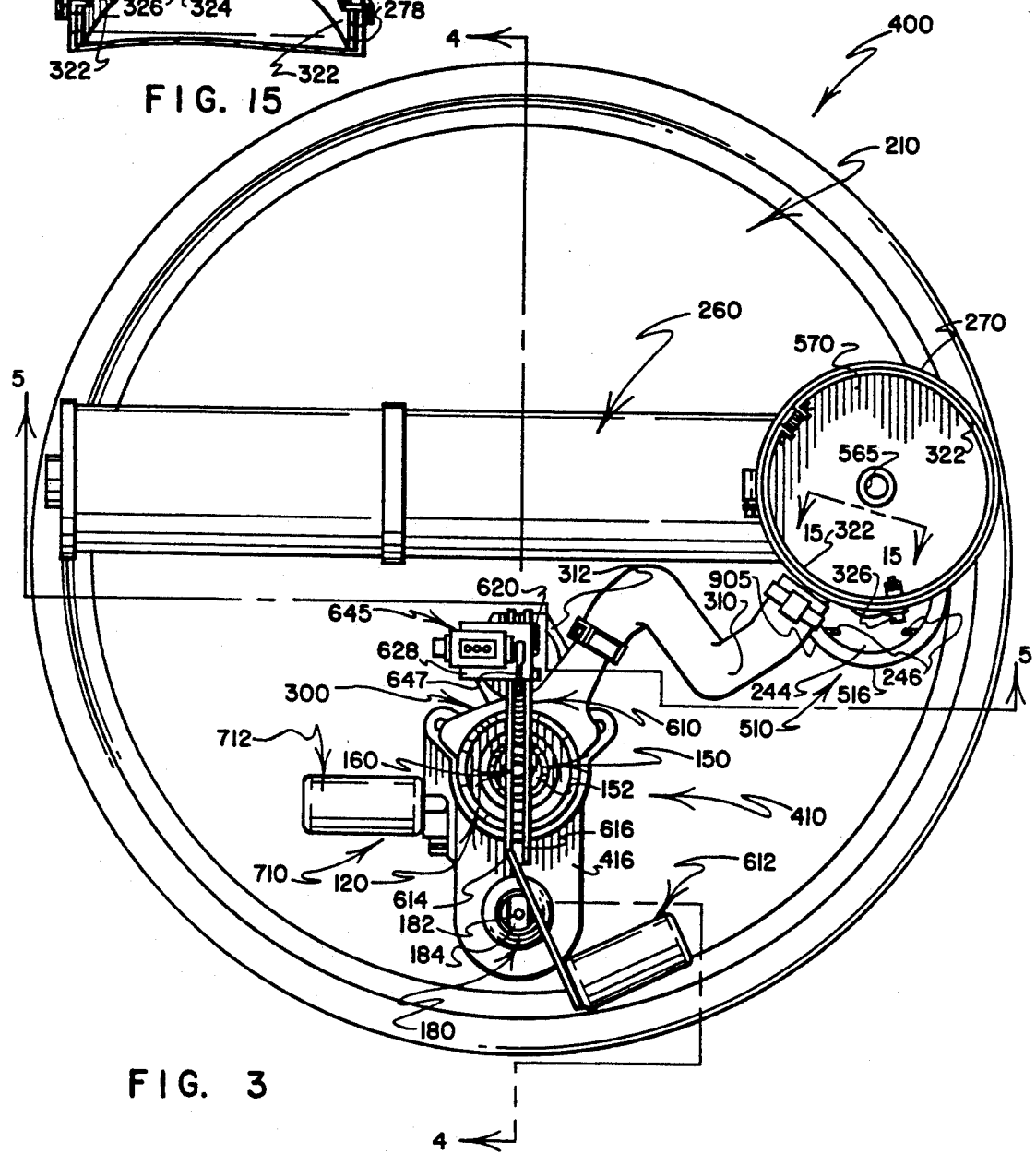
FIG. 3 is a top plan view of the apparatus of FIG. 2, but on an enlarged scale.
Figure 4:
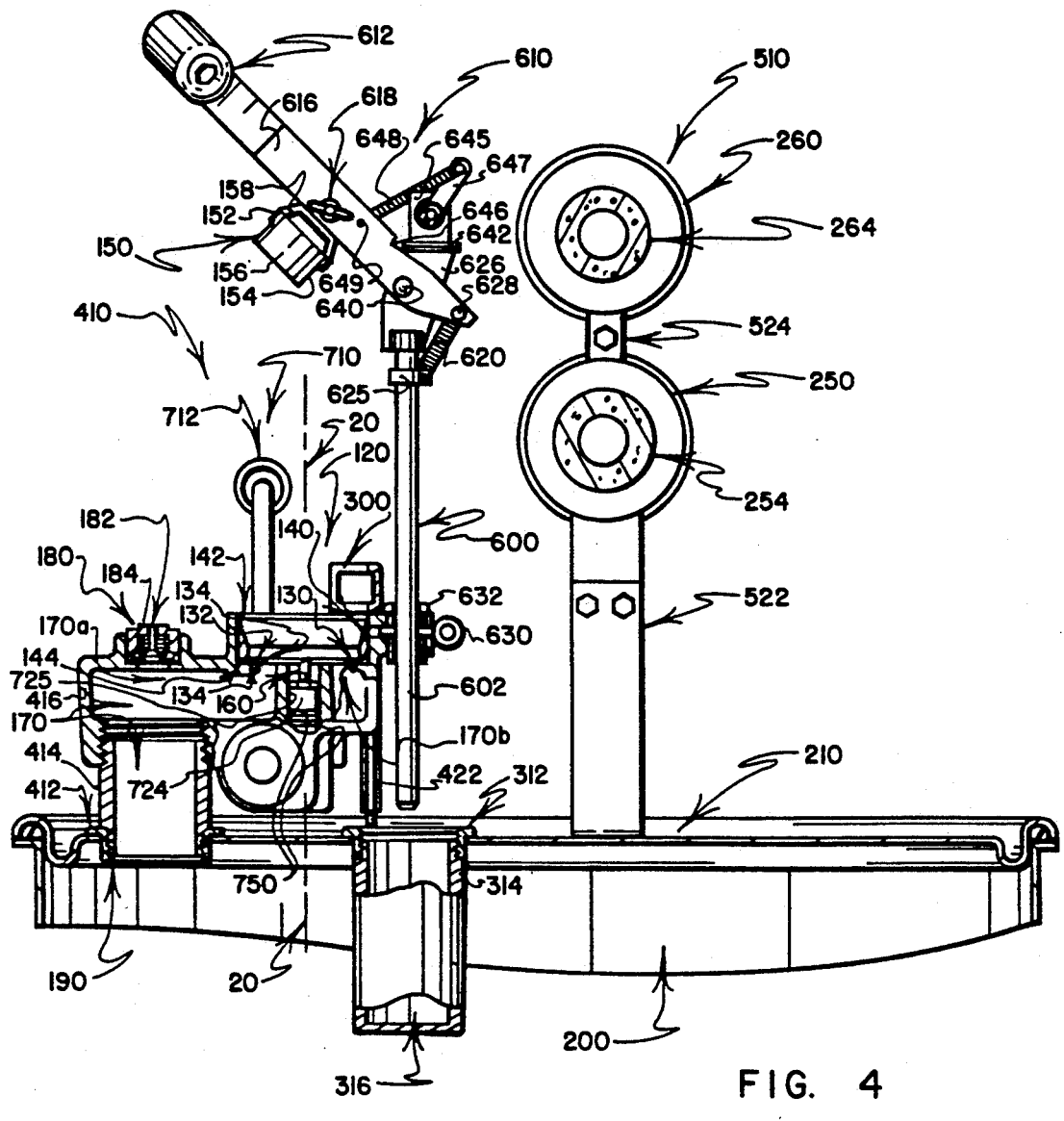
FIG. 4 is a sectional view as seen from planes indicated by a broken line 4—4 in FIG. 3.

Referring to FIGS. 1 and 8, a sleeve-shaped clamping member 150 overlies the workstation 120 at a distance spaced upwardly therefrom. As will be explained in greater detail, a lever operated mechanism, indicated generally by the numeral 610 in FIG. 8, is provided for supporting and movably positioning the clamping member 150. The mechanism 610 includes a hand-operable lever 612 that can be pivoted (between its "normal," upwardly extending position, as is shown in FIGS. 2–4, and its "operated," substantially horizontally extending position, as is shown in FIGS. 6–10) to enable the sleeve-shaped clamping member 150 to be brought into and out of engagement with upper end wall portions 118 of an aerosol spray can 110 that is centered at the workstation 120. When the clamping member 150 is in engagement with upper end wall portions 118 of an aerosol spray can 110 that is centered at the workstation 120, a downwardly directed force applied to the lever 612 will cause the clamping member 150 to apply a downwardly directed force to upper end wall portions 118 of the can 110, as is indicated by an arrow 152 in FIG. 1, to clamp peripherally extending portions 112 of the bottom wall 116 of the can 110 into firmly seated, sealing engagement with the upwardly facing seal surface 132 (or into sealing engagement with the upwardly facing auxiliary seal surface 132' if the auxiliary seal assembly 125 that is depicted in FIG. 10 is being utilized).

Also located at the workstation 120 is a vertically extensible and retractable piercing pin 160 that can be raised from the retracted position shown in FIG. 1 to an extended position shown in FIG. 8 to form a hole 114 in the bottom wall 116 of the aerosol can 110 that is clamped in place at the workstation 120 by the sleeve-shaped clamping member 150. By puncturing a hole 114 in the bottom wall 116 of an aerosol can 110 that is clamped in place at the workstation 120, contents from the punctured can 110 are permitted to discharge from the can 110 through the hole 114 and through a center opening that is defined by the inner diameter 136 of the annular seal 130 (or by the inner diameter 136' of the auxiliary annular seal 130' if the auxiliary seal assembly 125 that is depicted in FIG. 10 is in use), and thence into a discharge passage 170 that is provided beneath the annular seal 130.

Referring to FIG. 1, an arrow 162 indicates an upward path of travel (that extends along the imaginary centerline 20) that is followed by the piercing pin 160 in moving upwardly to pierce a hole 114 in the bottom wall 116 of the clamped can 110. Referring to FIG. 6 (wherein the piercing pin 160 is shown retracted) and to FIG. 7 (wherein the piercing pin 160 is shown extending into piercing engagement with the bottom wall 116 of an aerosol can 110), a rack and pinion mechanism that is indicated generally by the numeral 710 includes a hand-operable lever 712 that can be pivoted (between its "normal," upwardly extending position, as shown in FIGS. 3 and 6, and its "operated," substantially horizontally extending position, shown in FIG. 7) to extend and retract the piercing pin 160.

Figure 11:
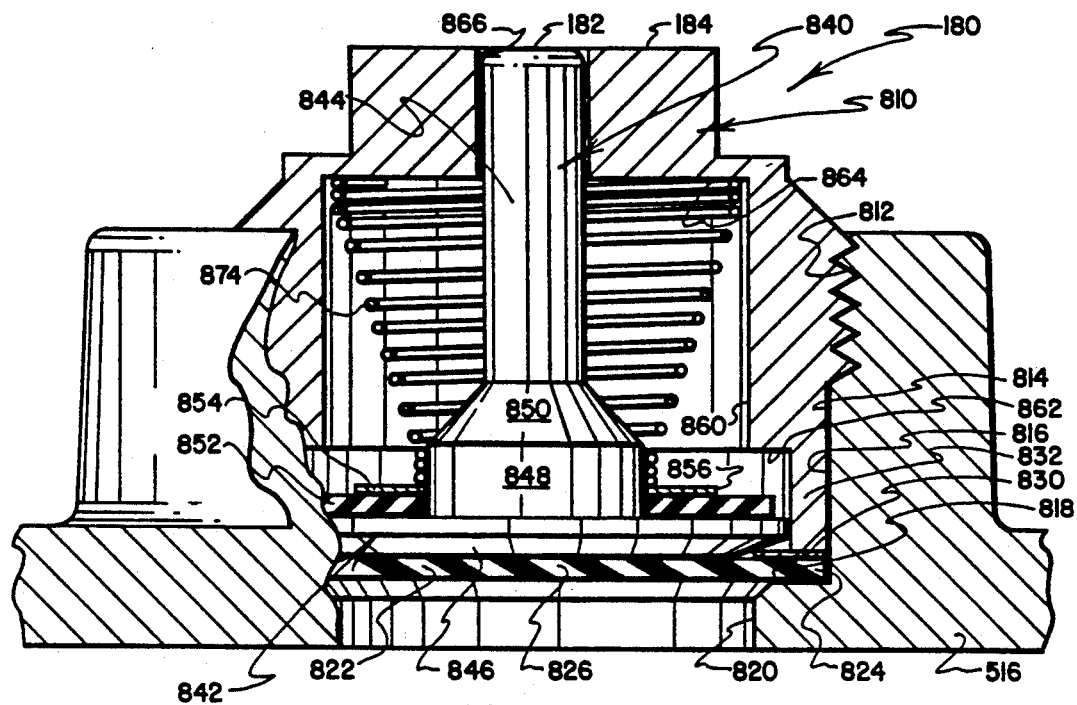
FIG. 11 is an enlargement of a portion of the sectional view of FIG. 6, showing details of construction of the pressure responsive indicator, with the indicator not being operated.

Referring again to FIG. 1, a discharge passage 170 communicates with a region of the workstation 120 that extends beneath the seal 130 and about the piercing pin 160. Contents from a punctured can 110 that flow through the center opening 136 of the annular seal 130 discharge into the passage 170, and are ducted by the passage 170, as is indicated by arrows 172. At a location along the passage 170 that is relatively near to the workstation 120, a pressure responsive device 180 is provided (see also FIGS. 11 and 12) that includes a vertically movable plunger 840, an upper end region of which is indicated by the numeral 182. As will be explained later in greater detail, when discharging contents from the punctured can 110 cause the pressure within the passage 170 to exceed ambient air pressure to any significant extent, the upper end region 182 of the plunger 840 is caused to raise (from its normally retracted position, as depicted in FIG. 11) so that the end region 182 projects upwardly a short distance (see FIG. 12) beyond a surrounding top surface 184 of a plug-shaped component 810 of the pressure responsive device 180.

When the upper end region 182 extends above the surface 184, this provides a visual indication to an operator that a can 110 that has been punctured at the workstation 120 should continue to be held in clamped engagement with the annular seal 130 until pressure within the passage 170 equalizes with that of ambient air (i.e., until the upper end surface 182 descends to the level of the surface 184), otherwise the temporarily higher-than-ambient-air-pressure surge that is experienced within the passage 170 might cause unwanted emissions to backflow and emanate from the vicinity of the workstation 120 (as by escaping from between peripheral bottom wall portions 112 of the can 110 and the upper surface 132 of the seal 130.

From the vicinity of the pressure responsive device 180, the passage 170 extends downwardly through a lid 210 of a receiving container that, in preferred practice, takes the form of a conventional upwardly opening fifty-five gallon drum, an upper end portion of which is indicated generally by the numeral 200. At the lower end of the passage 170, an opening 190 is defined, through which liquid, gas and vapor contents from a pierced can 110 is ducted into the drum 200, as is indicated by arrows 192.

Liquid that enters the drum 200 through the opening 190 is collected in a lower region of the drum 200 until the drum 200 is sufficiently filled that the lid 210 (together with the lid-mounted components of the system 100) should be removed from the drum 200 so that an identical but empty drum 200 can be substituted for the filled drum 200 to permit continued use of the system 100). Liquid that is collected in a drum 200 should be disposed of, in due course, in an environmentally appropriate manner, in compliance with laws and government regulations that govern the handling of the character of the particular liquid that has been collected.

Gaseous contents that enter the drum 200 tend to occupy an upper region of the drum 200 (i.e., a region that is located above a lower region wherein liquid contents have collected). As gaseous contents enter the drum 200, the gas typically is laden, at least to some extent, with vapor particles (i.e., small liquid droplets of substantially the same liquid composition that collects in a lower region of the drum 200). To assist in removing such droplets from the gas in which they are entrained, a screen filter 240 is provided in a passage 220 that extends initially upwardly from an opening 230 that is formed through the lid 210 at a location that is spaced from the lid opening 190.

Referring to FIG. 1 (and to FIGS. 13 and 14), the screen filter 240 is held in place by a compression coil spring 242 that engages the screen filter 240 at its lower end, and that engages a removable cover 244 at its upper end. A wire-formed spring clip 246 is provided for selectively holding the removable cover 244 in place, and for permitting the cover 244 to be removed so that access can be had to the removable screen filter 240. A U-shaped handle 248 is rigidly connected to the screen filter 240 to facilitate removal of the screen filter 240 for cleaning. A knob-shaped handle 249 is rigidly connected to the cover 244 to facilitate one's removing the cover 244 to access, remove, clean and replace the screen filter 240.

It has been found that screen filter 240 will, in many instances, significantly assist in extracting and collecting droplets of liquid from vapor that is entrained in gas that flows upwardly through the passage 220 from the drum 200. Some of the collected droplets will drop, under the influence of gravity, from the screen filter 240 back through the passage 230 and into a lower region of the drum 200 where liquid contents discharged from punctured aerosol cans is being collected. Other droplets that are collected by the screen filter 240 will tend to adhere to and coat the screen filter 240, whereby care needs to be taken during use of the system 100 to assure that, at appropriate periodic intervals, the screen filter 240 is removed, cleaned and replaced.

From the vicinity of the screen filter 240, the passage 220 ducts gaseous contents (as is indicated by arrows 251) to a first of two commercially available filter units 250, 260 that are connected in series so that the gas that is being filtered for eventual release to the atmosphere must pass first through the lower filter unit 250 (as is indicated by arrows 252) before being ducted upwardly (as is indicated by arrows 261) for passage through the second filter unit 260 (as is indicated by arrows 262). Filter elements 254, 264 are installed in the filter units 250, 260, respectively, and are selected to have a capability to effectively remove from the gas that is being filtered such vapor particles and other environmentally objectionable constituents as should not be vented to atmosphere.

As those who are skilled in the art will readily understand, a wide variety of filter elements are commercially available that are specifically designed for use in filter units of the type that are indicated by the numerals 250, 260, and that have various capabilities to remove particular types of constituents from particular types of gases. To ensure proper functioning of the system 100, appropriate filter elements 254, 264 must be selected, and such elements must be periodically checked and replaced at suitable intervals to assure that the character of the filtering action that is provided by the filter elements 254, 264 does not deteriorate due to build up of collected constituents within the filter elements 254, 264. With the use of appropriate filter elements 254, 264 installed in the filter units 250, 260, the gas that discharges from the second filter unit 260 (as is indicated by arrows 272) is suitable for release to the atmosphere.

To assist in drawing a flow of gas that is to be filtered from the drum 200 into the passage 220, through the screen filter 240 and through the filter units 250, 260, the gas flow 272 that discharges from the second filter unit 260 is drawn into a reduced pressure plenum 270. In preferred practice, the plenum 270 takes the form of a length of relatively large diameter wire-reinforced flexible hose 274 that is closed at its lower end by a generally funnel-shaped casting 276.

In FIG. 1, arrows 272, 281, 282 show that filtered gas which is discharged from the second filter unit 260 is ducted into a lower end region of the plenum 270, and is drawn through the length of the plenum hose 274 for delivery to a wall-mounted blower 280. The blower 280 is preferably of a centrifugal type that draws gas from the plenum hose 270 and discharges it through a duct 290 (as is indicated by an arrow 291) to atmosphere, preferably with the duct 290 being connected to a raised stack or other suitably configured, commercially available externally located discharge vent (not shown).

The blower 280 preferably is selected from among commercially available motor-driven blowers of an "explosion proof" type, and is operated so that it maintains within the plenum hose 270 a pressure that is lower than ambient air pressure, typically by about five pounds per square inch. If desired, a commercially available flow control (not shown) can be provided in the vicinity of the blower 280 to assist in regulating the flow rate at which gas is caused to pass from the plenum 270 through the blower 280

A safety feature that is provided in accordance with the preferred practice of the present invention has to do with the provision of a plenum-connected emissions collector 300 that is provided adjacent the workstation 120. The collector 300 is a wide-mouthed, funnel-shaped structure that extends arcuately about a limited portion of the periphery of the centering ring 140 at a location that is spaced a short distance above the upwardly facing surface 132 of the annular seal 130. A hose 310 extends from the collector 300 to a valve regulated passage 320 that opens through a cylindrical sidewall 278 of the funnel-shaped casting 276 that closes the bottom end region of the plenum hose 270.

Figure 15:
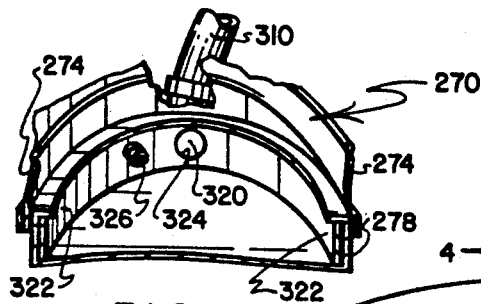

Referring to FIGS. 1 and 15, a band-like slide valve member 322 extends along a cylindrical inner surface of the sidewall 278 of the casting 276, and has an opening 324 formed therethrough that is alignable to a selected degree with the passage 320. Depending on the extent to which the opening 324 is aligned with the passage 320, the rate of flow at which ambient air is drawn through the collector 300, through the hose 310, through the passage 320 and into the plenum 270 is regulated within a range that, at full alignment of the opening 324 with the passage 320 will provide a relatively brisk flow across the workstation 120, to substantially no flow at all—which is what results when the opening 324 is moved to a position of non-alignment with the passage 320. Referring to FIG. 1, an operating knob 326 is connected to the slide valve member 322 and extends through a slot 328 that is formed through the cylindrical sidewall 278 of the casting 276. The extent to which the opening 324 aligns with the passage 320 is controlled by selectively positioning the knob 326 along the slot 328.

In preferred practice, the knob 326 is set to provide a flow of ambient air across the workstation 120 and into the collector 300 that is sufficient to entrain such gas emissions as may emanate from the vicinity of the workstation 120 (and might otherwise escape into the workplace environment), with the flow not being so great as to tend to cause gaseous contents to backflow through the passage 170. While the vast majority of the gas that is taken in through the collector 300 for ducting through the hose 310 into the plenum 270 (as is indicated in FIG. 1 by arrows 311) tends to be principally ambient air, the presence of the collector 300 and the capability it provides to collect such gaseous emissions as may emanate from the vicinity of the workstation 120 constitute a safeguard for ensuring that environmentally objectionable constituents of contents of punctured aerosol spray cans are not permitted to emanate from the workstation 120 into the surrounding workplace environment.

Having provided the foregoing overview of the operation of the system 100 as by referring principally to the schematic diagram of FIG. 1, reference is made to FIGS. 2 and 3 (and, in association therewith, to FIGS. 4–15) wherein features of an apparatus 400 are depicted, with the apparatus 400 being of a type that preferably is used to implement the best mode known for practicing the system of the present invention. While what is depicted in FIGS. 2 and 3 does not include a showing of all portions of the drum 200 or of the plenum hose 270, and while depictions of the blower 280 and the discharge duct 290 are omitted entirely from FIGS. 2 and 3, it will be understood that no additional description or depiction of the drum 200, the plenum hose 270, the blower 280 or the duct 290 needs to be presented to enable those who are skilled in the art to carry out the preferred practice of the present invention.

Referring to FIGS. 2 and 3, the majority of the components that form the apparatus 400 are "lid-mounted" in the sense that they are connected to and are movable with the lid 210 of the drum 200. Moreover, the components that comprise the apparatus 400 can be thought of as comprising, in essence, two separate upstanding lid-mounted assemblies that are indicated generally by the numerals 410, 510—with the hose 310 being the only component of the apparatus 400 (other than the lid 210) that interconnects the upstanding assemblies 410, 510.

Referring to FIG. 2, the lid 210 is provided with three threaded connectors or "bungs" 312, 412, 512 that each preferably are internally threaded to receive what is nominally known as two-inch pipe (i.e., standard, commercially available pipe having about a two and three-eights inch outer diameter). Threaded into the bung 312 and depending from the underside of the lid 210 is a closed-bottom tubular member 314 that defines an upwardly opening well 316 that serves to loosely receive the bottom end region of a mounting post 600 of the lever operated clamping mechanism 610, described later herein.

Threaded into the bung 412, and forming a component part of the upstanding assembly 410, is a nipple 414 that extends upwardly from the lid 210 to define a portion of the passage 170 through which contents that are emptied from a punctured can 110 at the workstation 120 discharge into the drum 200. Threaded into the bung 512, and forming a component part of the upstanding assembly 510, is a nipple 514 that extends upwardly from the lid 210 to define a portion of the passage 220 through which gas with vapor entrained therein passes from the drum 200 on its way to the screen filter 240.

Upper end regions of the nipples 414, 514 are threaded into castings 416, 516, respectively, that cooperate with the nipples 414, 514 to define portions of the passages 170, 220, respectively. The casting 416 mounts the pressure responsive device 180 at a location directly above the upper end of the nipple 414. The casting 516 mounts the screen filter 240 at a location directly above the upper end of the nipple 514.

The castings 416, 516 have portions 418, 518, respectively, that extend transversely relative to their associated nipples 414, 514, for defining transversely-extending portions 170a, 220a of the passages 170, 220, respectively. The castings 416, 516 also have portions 420, 520 that open upwardly to define upwardly-extending portions 170b, 220b of the passages 170, 220, respectively.

At the upper end region of the passage portion 170b, the casting 416 is provided with formations (which will be described shortly) that extend substantially concentrically about the center axis 20 to assist in defining the workstation 120. Depending from the casting 416 are a pair of support legs 422 that extend into a pair of spaced dimples 212 (see FIG. 9) that are formed in the drum lid 210. The support legs 422 cooperate with the nipple 414 to support the casting 416 atop the drum lid 210.

Figure 5:
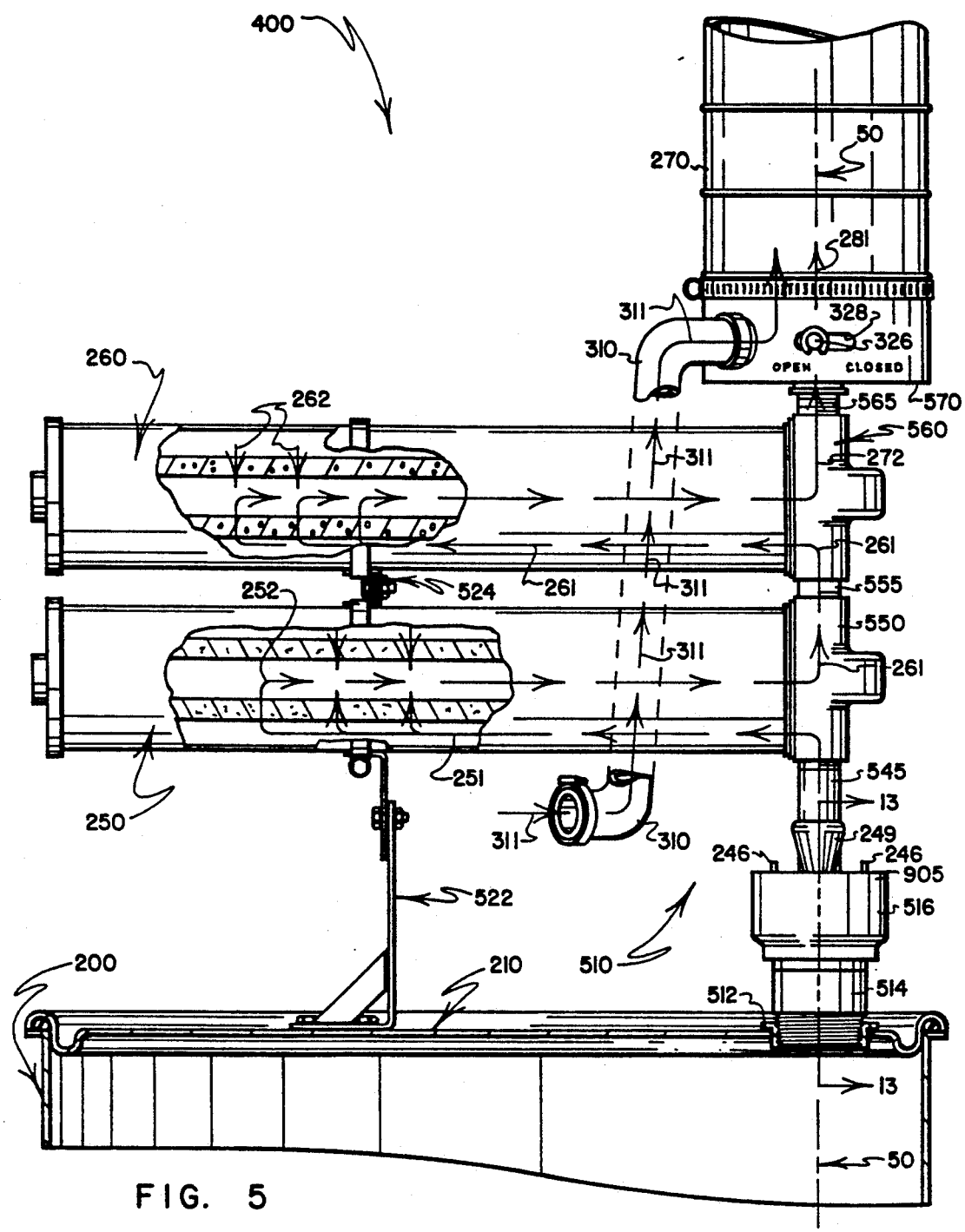
FIG. 5 is a front elevational view of the apparatus of FIG. 2, but with selected forwardly-located components of the apparatus removed to permit rearwardly-located components to be viewed, and with portions of the rearwardly-located components being broken away to permit otherwise hidden features to be seen, whereby depicted components are presented substantially as seen from planes that are indicated by a broken line 5—5 in FIG. 3.

At the upper end region of the passage portion 220b, the casting 516 is internally threaded to receive a pipe nipple 545 that extends upwardly along an imaginary vertically extending axis 50 for connecting the casting 416 to a bottom side of the head 550 of the filter unit 250. Also extending upwardly along the axis 50 are a pair of pipe nipples 555, 565. The nipple 555 connects with a top side of the head 550 of the filter unit 250, and with a bottom side of the head 560 of the filter unit 260. The nipple 565 connects with a top side of the head 560 of the filter unit 260 and with a bottom wall of a casting 570 that closes the lower end region of the plenum hose 270. Referring to FIG. 5, a support bracket assembly 522 has its upper end region rigidly connected to the filter assembly 250, and its lower end region rigidly connected to the drum lid 210. Interposed between and rigidly interconnecting the filter assemblies 250, 260 at a location that is above the support bracket assembly 522 is a support bracket assembly 524. The support bracket assemblies 522, 524 cooperate with the nipple 514 to support the filter assemblies 250, 260 atop the drum lid 210.

Referring to FIGS. 6–8, in the vicinity of the workstation 120, the casting 416 provides an upstanding, generally cylindrical wall formation 425 that has an inner surface 427 which receives the outer diameter surfaces 148 of the interchangeable centering rings 140 in a slip fit. The inner surface 427 also surrounds the outer diameter 138 of the annular seal 130.

Referring to FIG. 6, at the base of the cylindrical inner surface 427, an upwardly facing shoulder 429 is provided by the casting 416. The shoulder 429 underlies the bottom face 134 of the annular seal 130 to securely support the seal 130 so that the seal 130 can, in turn, securely support aerosol cans 110 that are positioned atop its upwardly facing surface 132. The upwardly facing shoulder 429 extends about an upwardly directed opening 431 of the passage 170, and aligns with a center opening that is defined by the inner diameter 136 of the annular seal 130.

The inner diameter surface 136 of the seal 130 is of sufficiently small diameter to assure that, when most "standard" sizes of aerosol spray cans 110 are centered atop the upwardly facing side surface 132 of the seal 130, a bottom rim 112 of the aerosol can 110 will contiguously engage the upwardly facing surface 132 along a ring-like area of engagement that encircles the inner diameter surface 136. However, as has been described above, if an unusually small "standard" diameter aerosol can 110 is to be punctured at the workstation, the auxiliary seal ring assembly 125 that is depicted in FIG. 10 is installed atop the seal 130 to provide an upwardly facing seal surface 130' that extends inwardly adequately far to receive and support a bottom rim 112 of the unusually small aerosol can 110.

Referring to FIG. 8, the sleeve-shaped clamping member 150 has a generally cylindrical bottom wall portion 152, with front and rear portions 154 cut away to permit an operator to properly view the manner in which curved bottom wall portions 156 are brought into engagement with upper end portions 118 of an aerosol can 110 that is positioned and centered at the workstation 120. Extending upwardly from the generally cylindrical bottom wall is an A-shaped support 158 that, at its upper end, extends between a pair of spaced, parallel-extending arms 614, 616 that form opposite sides of the hand-operated lever 612.

The support 158 has a thickness that lets it slide snugly between the spaced arms 614, 616, and that can be firmly clamped by the arms 614, 616 when a threaded fastener 618 (that extends through aligned holes, not shown, that are formed through the arms 614, 616 and through the support 158) is tightened in place. The threaded fastener 618 provides a connection between the sleeve-shaped clamping member 150 and the hand-operated lever 612 that permits the orientation of the clamping member 150 to be adjusted relative to the arms 614, 616 so that, when the clamping member 150 is brought into clamping engagement with the upper end region 118 of an aerosol can 110 that is positioned and centered at the workstation 120, the curved bottom wall portions 156 will properly engage the upper end region 118 of the can 110 along a majority of the lengths of the bottom wall portions 156.

The lever-operated clamping mechanism 610 that supports the clamping member 150 includes the arms 614, 616, an upstanding post assembly 600 to which the arms 614, 616 are pivotally connected by a pivot pin 618, and a pair of tension coil springs 620 (only a left one of the springs 620 is depicted in FIG. 8, while only a right one of the springs 620 is depicted in FIGS. 4, 6, 7 and 10, with portions of both of the springs 620 being visible in FIG. 9). Lower ends of the springs 620 connect with a mounting bracket 625 that is rigidly connected to the post 600. Upper ends of the springs 620 extend around headed formations 628 that are carried by the rear end regions of the arms 614, 616.

Referring to FIGS. 6 and 7, the post 600 includes an elongate rod 602 that has a series of spaced, forward-and-rearwardly-extending holes 604 drilled through it to removably receive a latch pin 630 that also extends through aligned holes 417, 633 that are formed in the casting 416 and in a sleeve 632 that is supported by the casting 416. The sleeve 632 is pressed into a vertically extending hole 634 that is formed through a rearwardly extending formation 636 of the casting 416, and receives the rod 602 in a slip fit that permits the rod 602 to be adjusted upwardly and downwardly with respect to the casting 416. The provision of an array of holes 604 into which the latch pin 630 can be inserted enables the lever-operated mechanism 610 to be adjusted to accommodate substantially all known "standard" heights of aerosol spray cans.

A mounting plate 626 is welded to the upper end region of the rod 602, and extends between the lever arms 614, 616. Aligned holes (not shown) are formed through the lever arms 614, 616 and through the mounting plate 626 to receive a pivot pin 640 that pivotally connects the lever arms 614, 616 to the post assembly 600. A horizontally extending plate 642 is welded atop the mounting plate 626. The arms 614, 616 have notches 644, 646 formed therein that are configured to engage a front edge portion of the plate 626 to stop upward pivotal movement of the arms 614, 616 at a desired position that is selected to ergonomically position the handle 612 that is supported by forward end regions of the arms 614, 616.

Mounted atop the horizontally extending plate 642 is a conventional, knob-resettable counter assembly 645 that has an operating lever 647. A tension coil spring 648 is provided to connect the operating lever 647 of the counter to a roll pin 649 that is installed in aligned holes formed through the arms 614, 616. By this arrangement, each time the handle-carrying lever 612 is pivoted downwardly about the axis of the pivot pin 640 to bring the clamping member 150 into engagement with an aerosol can 110 that has been newly positioned and centered at the workstation 120, the spring 648 will cause the arm 647 of the counter 645 to be operated to advance by a count of "one" the "count" that is displayed by the counter 645.

Referring to FIGS. 6, 7 and 9, the lever-operated mechanism 710 that movably supports the piercing pin 160 includes the handle-carrying lever 712, an operating shaft 714, a pinion 716 that is mounted on the shaft 714, and a gear rack 718 that has teeth 720 that drivingly engage the teeth 722 of the pinion 716 for raising and lowering a piston-shaped mount 724 that carries the piercing pin 160 at its upper end. As is best seen in FIG. 9, the shaft 714 extends through a passage 723 that opens through left and right sides of the casting 416.

The left end of the shaft 714 receives a threaded fastener 726 that extends through a cylindrical base 727 of the connects the handle-carrying lever 712 to rigidly connect the handle-carrying lever 712 to the shaft 714 for pivotal movement therewith about the axis of the shaft 714. A torsion coil spring (not shown) is interposed between the base 727 and the casting 416 to bias the handle-carrying lever 712 toward is "normal" upright position (depicted in FIGS. 3, 4, 6, 9 and 10)— with the force exerted by the torsion coil spring on the lever 712 and on the shaft 714, the pinion 716, the gear rack 718 and the piercing pin 160 being sufficient to assure that if an operator releases his grasp on the lever 712, the lever 712 will return to its "normal" upright position, and the piercing pin 160 will return to its retracted position, thereby eliminating the possibility that one might accidentally try to clamp an aerosol can 110 in place at the workstation 120 while the piercing pin 160 is inadvertently raised to project above the annular seal 130

A bearing sleeve 728 is installed in the passage 723 at a location near the pinion 716 for assisting to journal the shaft 714 for smooth rotation relative to the casting 416. The right end of the shaft 714 receives a threaded fastener 730 that carries a washer 732 for assisting to retain the shaft 714 in place within the passage 725. The pinion 716 is rigidly connected to the shaft 714 for rotation therewith in response to pivotal movement of the handle-carrying lever 712 about the axis of the shaft 714.

The gear rack 718 extends vertically along the center axis 20, and is mounted by the casting 416 so as to be slideable vertically along the center axis 20 in response to force being transmitted to its teeth 720 by the teeth 722 of the pinion 716. The piston-shaped mount 724 extends upwardly through a generally cylindrical passage 748 that is formed in the casting 416. A pair of O-rings 750 are carried in spaced grooves that extend circumferentially about the piston-shaped mount 724 to prevent the passage of fluid from the discharge passage 170 alongside the piston-shaped mount 724.

Referring to FIG. 8, the piercing pin 160 is defined by a pointed upper end region of an elongate member 162 that carries threads 164. The threaded lower end region 164 is threaded into a threaded, upwardly opening hole that opens through a top surface 726 of the piston-shaped mount 724. A lock nut 728 is carried on the threaded end region 164 and is tightened into engagement with the top surface 726 of the piston-shaped mount 724. By this arrangement, the extent to which the piercing pin 160 projects above the top surface 726 can be adjusted, as desired, and the piercing pin 160 can be removed and replaced if need be due to wear.

Figure 12:
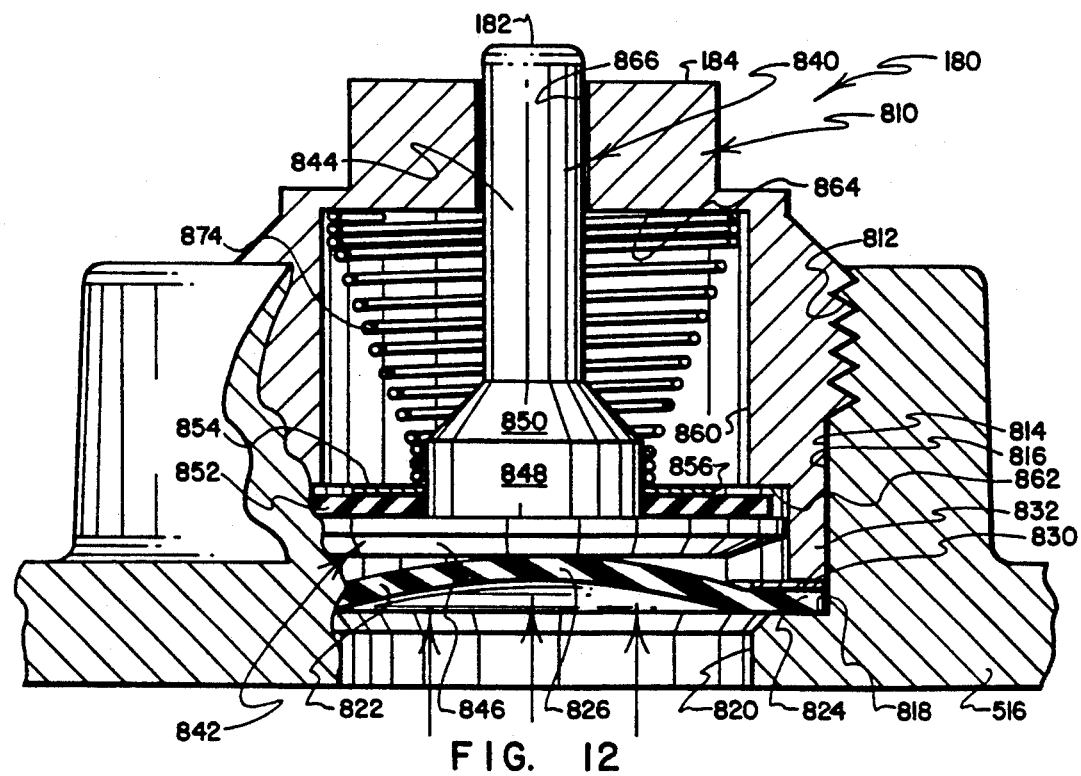
FIG. 12 is an enlargement of a portion of the sectional view of FIG. 7, showing the pressure responsive indicator operated.

Referring to FIGS. 11 and 12, the pressure responsive indicator device 180 includes a plug-shaped member 810 that is threaded into a threaded upper end region 812 of an opening 814 that is formed in the casting 414. The opening 814 has a relatively large diameter smooth-bore portion 816 that extends downwardly from the threaded upper end region 812 to a location where an upwardly facing shoulder 818 is provided that forms a transition between the relatively large diameter smooth-bore portion 816, and a smaller diameter portion 820 that opens into the discharge passage 170. A thin flexible diaphragm 822 has its periphery 824 seated atop the shoulder 818. The diaphragm 822 has a central region 826 that bridges the space that is surrounded by the shoulder 818, with the bottom side of the central region 826 being exposed to the flow of contents from punctured aerosol cans that is ducted through the passage 170.

A thin metal washer 830 is seated atop the periphery 824 of the thin flexible diaphragm 822. A ring-shaped bottom portion 832 of the plug-shaped member 810 overlies the periphery of the metal washer 830 and is clamped into engagement therewith when the plug-shaped member 810 is threaded into the threaded upper end region 812 of the opening 814. The clamping force that is applied to the thin metal washer 830 by the ring-shaped bottom portion 832 of the plug-shaped member 810 causes the thin metal washer 830 to cooperate with the shoulder 818 to securely clamp the periphery 824 of the diaphragm 822 therebetween such that, even if the central region 826 of the diaphragm 822 should stretch and/or flex, the periphery 824 of the diaphragm 822 will remain clamped in place in the manner that is depicted in FIGS. 11 and 12.

A plunger 840 that has a relatively large diameter head 842 formed at its bottom end, and a relatively small diameter elongate shaft formation 844 at its upper end is positioned above the diaphragm 822, with a bottom surface 846 of the head 842 engaging the upper surface of the central region 826 of the diaphragm 822. Adjacent the relatively large diameter head 842, the plunger has a relatively large diameter shaft formation 848 that is joined by a tapered transition portion 850 to the relatively small diameter elongate shaft formation 844. A resilient washer 852 is carried by the plunger 840 at a location adjacent the upper surface of the head 842. The resilient washer extends about a lower end region of the relatively large diameter shaft formation 848. Seated atop the resilient washer 852 is a thin metal washer 854 that rings the shaft formation 848 and has an outer diameter 856 that is smaller than is defined by a cylindrical wall 860 that is defined on the interior of the plug-shaped member 810.

The cylindrical interior wall surface 860 of the plug-shaped member 810 extends upwardly from a downwardly-facing shoulder 862 that forms a transition from the wall surface 860 to the ring-shaped bottom portion 832 of the plug-shaped member 810. At the upper end of the cylindrical interior wall surface 860, a transversely extending surface 864 forms a transition from the wall surface 860 to where a hole 866 extends upwardly to open through the top surface 184 of the plug-shaped member 810. The hole 866 is of a size that receives the elongate, relatively small diameter shaft portion 844 in a slip fit, whereby vertical movements of the plunger 840 are guided by the slip-fit engagement of the shaft portion 844 in the hole 866.

Interposed between the thin metal washer 854 and the transversely extending surface 864 is a lightweight compression coil spring 874 that serves to bias the plunger 840 downwardly toward a normally seated position that is depicted in FIG. 11, wherein peripheral portions of the head formation 844 are seated in engagement with the thin metal washer 830, and wherein the central region of the head formation 844 engages the central region 826 of the diaphragm 822. The component positions that are depicted in FIG. 11 are the "normal" positions of the depicted components, and represent the component positions that are assumed when the pressure within the discharge passage 170 is not significantly greater than ambient atmospheric pressure.

When, however, a substantial flow of gaseous and liquid contents discharges through the passage 170 from a newly punctured hole that is formed in an aerosol can that is clamped in place at the workstation 120, the pressure that is experienced within the discharge passage 170 may be caused to rise in spike-like fashion to a pressure that is substantially greater than ambient atmospheric pressure, which will cause the central region 826 of the diaphragm 822 to flex upwardly, as is depicted in FIG. 12. When the central region 826 of the diaphragm 822 is caused to flex upwardly, the plunger 840 is likewise caused to move upwardly in opposition to the biasing action of the compression coil spring 874, whereby the upper end surface 182 of the shaft formation 844 is caused to project noticeably above the upper surface 184 of the plug-shaped member 810, as is depicted in FIG. 12, to provide a visual signal to an operator that warns against a premature release of clamping force that is being applied to a workstation-positioned aerosol can by the sleeve-shaped clamping member 150. Once the pressure within the discharge passage 170 subsides to a pressure that is substantially the same as ambient atmospheric pressure, the upper end surface 182 of the shaft formation 844 will once again resume is normal position wherein it extends substantially level with the upper surface 184 of the plug-shaped member 810, as is depicted in FIG. 11, thereby providing a visual signal to the operator that it is safe to release clamping force that is being applied by the sleeve-shaped clamping member 150 to a punctured aerosol can that is ready to be removed from the workstation 120.

A safety feature that is incorporated into the design of the pressure responsive indicator device 180 has to do with the provision of the resilient washer 852 atop the enlarged head 842 of the plunger 840—which engages the downwardly facing shoulder 862 of the plug-shaped member 810 when the plunger 840 is fully raised in opposition to the action of the compression coil spring 874. In the unlikely event that a leak or rupture should occur in the diaphragm 822 (or if contents from the passage 170 should somehow succeed in bypassing the diaphragm 822 so as to enter the region immediately above the diaphragm 822), the plunger 840 will be caused to move upwardly (by pressure within the passage 170) to bring the resilient washer 852 into sealing engagement with the downwardly facing shoulder 862 to prevent the escape of contents from the passage 170 past the plunger 842 through the upwardly opening hole 866 that is formed in the plug-shaped member 810.

Figure 13:
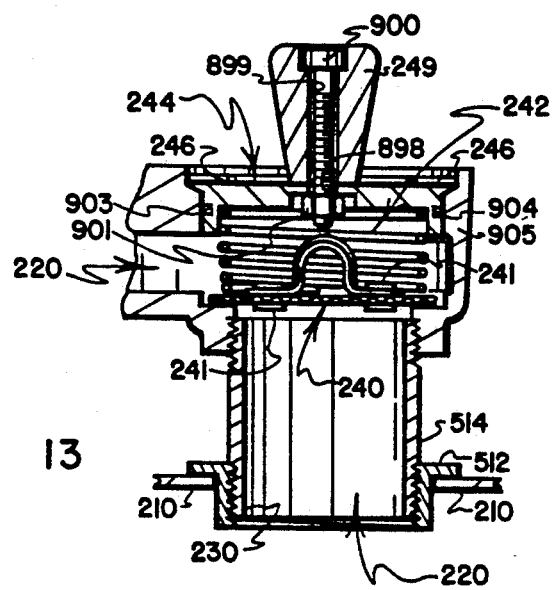
FIG. 13 is a sectional view, on an enlarged scale, as seen from a plane indicated by a line 13—13 in FIG. 5.
Figure 14:
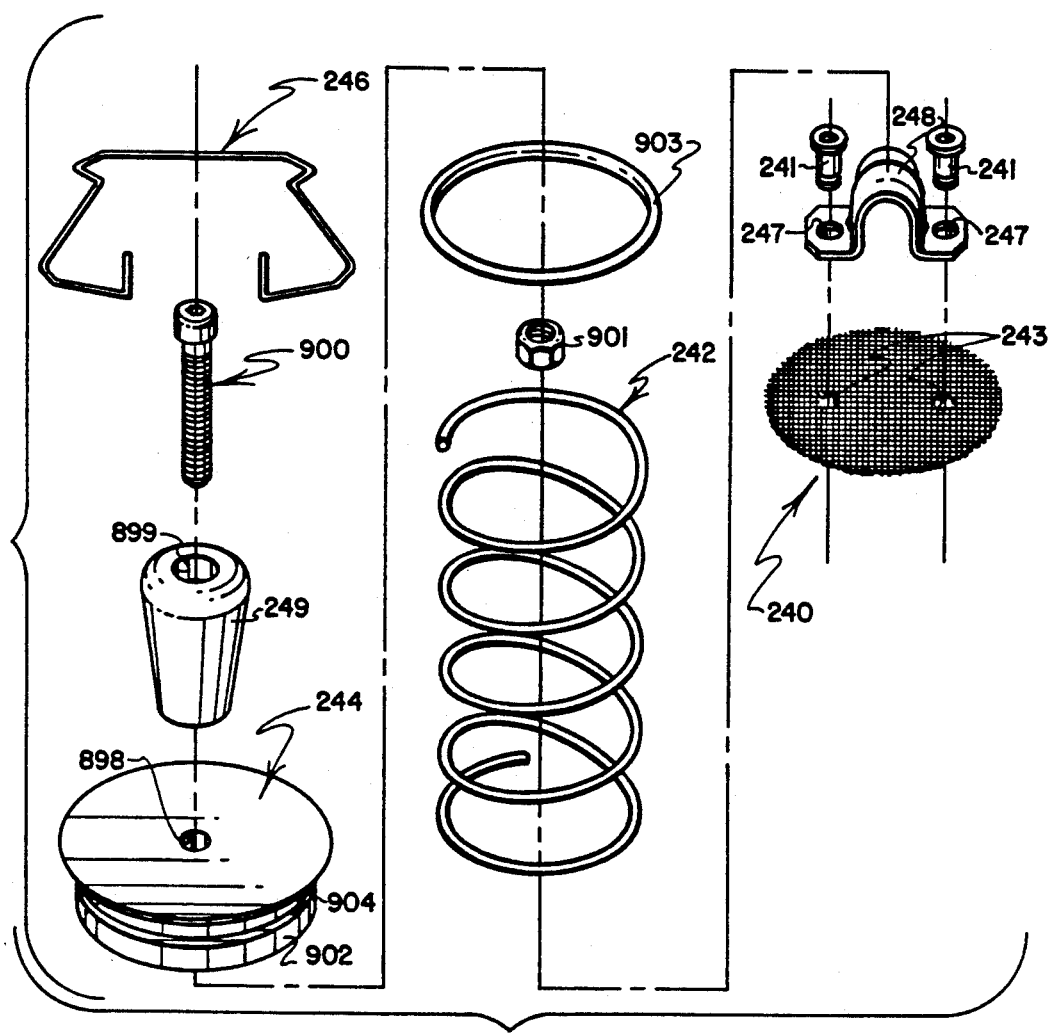
FIG. 14 is an exploded perspective view showing selected components that are depicted in FIG. 13; and, FIG. 15 is a perspective view of portions of the lower end region of a plenum assembly of the apparatus that is depicted in FIG. 2, with portions thereof shown in cross-section substantially as seen from a plane indicated by a line 15—15 in FIG. 3.

Referring to FIGS. 13 and 14, the screen filter 240 is connected to the U-shaped handle 248 by a pair of rivets 241 that extend through aligned holes 243, 247 formed through the screen filter 240 and through end portions of the handle 248, respectively. The cover 244 and the knob-shaped handle 249 have aligned holes 898, 899 formed therethrough, into which a threaded fastener 900 is inserted. A nut 901 is threaded onto the fastener 900 to securely connect the knob-shaped handle 249 to the cover 244. A cylindrical outer wall surface 902 of the cover 244 has a circumferentially extending groove 904 in which an O-ring 903 is carried. As is best seen in FIG. 13, the O-ring 903 forms a seal between the cover 244 and an upstanding, generally cylindrical wall portion 905 of the casting 516 that defines an opening 906 in which the cover 244 normally is releasably retained by the wire-formed spring clip 246.

As will be apparent from the foregoing description, the present invention provides a versatile system that is well suited for use with substantially all known "standard" sizes of aerosol cans to permit such cans to be emptied of their contents, to provide for the collection for environmentally appropriate disposal of liquid contents, and to filter gaseous contents to remove environmentally objectionable constituents therefrom so that the filtered gas can be vented to atmosphere. By utilizing a set of centering rings 140 that have different diameters that are suitable for use with various "standard" diameters of aerosol spray cans, and by providing a post-mounted clamping mechanism that is height-adjustable for use with various "standard" heights of aerosol spray cans, the system of the present invention is well suited for use with substantially all known "standard" sizes of aerosol spray cans. Moreover, by selecting suitable filter elements 254, 264 for installation in the filter units 250, 260, the system of the present invention easily can be adapted to remove substantially any type of environmentally objectionable constituent from such gaseous contents as normally are found in aerosol spray cans.

While such terms as "horizontally extending," "left," "right" and the like are utilized herein, it will be understood that such terms are used merely to aid the reader in referring to features in the orientations in which they are depicted in the accompanying drawings, and are not to be construed as limiting the scope of the claims that follow.

While the invention has been described with a certain degree of particularity, it will be understood that the present disclosure of the preferred embodiment has been made only by way of example, and that numerous changes in the details of construction and the combination and arrangement of elements can be resorted to without departing from the true spirit and scope of the invention as hereinafter claimed. It is intended that the patent shall cover, by suitable expression in the claims, such features of patentable novelty exist in the invention.

What is claimed is:

1. A method for puncturing aerosol spray cans, one at a time to discharge contents therefrom, for collecting liquid contents that discharge from the punctured cans for environmentally appropriate disposal, and for filtering gaseous contents that discharge from the punctured cans to remove environmentally objectionable constituents therefrom before releasing the filtered gas to atmosphere, comprising the steps of:

a) providing workstation means including structure for defining a workstation for receiving and guiding upright-oriented aerosol spray cans, one at a time, to a predetermined workstation location 1) wherein peripheral portions of the bottom end region of each received can are substantially centered about an imaginary vertical center axis that extends substantially centrally through the workstation, and 2) wherein peripheral portions of the bottom wall of each received can are centered and seated atop an annular resilient seal that forms a part of said structure and is positioned by said structure to present a upwardly facing seal surface that is substantially centered about said center axis and that extends substantially horizontally for engaging said peripheral portions of the bottom wall of each received can in a substantially contiguous ring-shaped region of engagement that encircles said center axis substantially concentrically at a location that surrounds a center opening that is defined by the annular resilient seal;

b) providing clamping means at a location along said center axis that is spaced above and overlies said workstation location for engaging upper end portions of each aerosol spray can that is received at the workstation location for exerting downwardly directed force on each such received can to clamp the received can in position at the workstation location, with said peripheral bottom wall portions of the clamped can being pressed into firm sealing engagement with said upwardly facing seal surface to form an uninterrupted ring-shaped seal between the seal surface and the bottom wall of the clamped can along said substantially contiguous ring-shaped region of engagement;

c) providing puncturing means that is operable to extend a pointed piercing pin upwardly along said center axis and through the center opening from a retracted position located beneath the upwardly facing seal surface to an extended position located above said upwardly facing seal surface to puncture the bottom wall of each aerosol spray can that is received and clamped in position at said workstation location, and to retract the pointed piercing pin along said center axis to said retracted position after effecting each such puncture, whereby contents from each punctured can that is received and clamped in position at the workstation location are caused to discharge through the center opening;

d) providing discharge passage means for receiving contents that discharge through the center opening from aerosol spray cans that are positioned, clamped and punctured one at a time at the workstation location for ducting such contents into a receiving container that has a lower region wherein discharged liquid contents can be collected for environmentally appropriate disposal, and having an upper region into which discharged gaseous contents can be received;

e) providing filtering means for communicating with upper region of the receiving container for ducting gaseous contents discharged from punctured aerosol cans through filter means that is capable of removing environmentally objectionable constituents therefrom;

f) providing reduced pressure plenum means 1) for defining a reduced pressure plenum wherein the gaseous contents of the plenum are maintained a pressure that is less than ambient atmospheric pressure, 2) for communicating with the filter means to receive filtered gas therefrom, and 3) for discharging contents of the reduced pressure plenum to atmosphere while maintaining said less than ambient atmospheric pressure within the plenum;

g) providing emissions collection means adjacent the workstation location for ducting a flow of ambient air from the region located above the upwardly facing seal surface and into the reduced pressure plenum so that, if gaseous emissions from contents that are discharged from aerosol spray cans at the workstation location should rise from the workstation location, such emissions will be entrained in said flow of ambient air that is ducted into the reduced pressure plenum; and, h) processing aerosol spray cans, one at a time, to puncture each such can and to withdraw and treat its contents by 1) positioning aerosol spray cans, one at a time, so as to be received and centered about said center axis at the workstation location, 2) operating the clamping means to clamp each spray can that is positioned at the workstation location so that peripheral portions of the bottom walls of each such can are held in firmly sealed engagement with the upwardly facing seal surface, 3) operating the puncturing means to extend and retract the piercing pin to puncture the bottom walls of clamped cans and to thereby cause contents of each punctured can to discharge through the center opening and to be ducted through the discharge passage means into the receiving container, 4) collecting liquid contents in a lower region of the receiving container, 5) drawing gaseous contents from the upper region of the receiving container through the filtering means to filter environmentally objectionable constituents therefrom, 6) ducting filtered gas from the filter means into the reduced pressure plenum for discharge to atmosphere, and 7) drawing into the reduced pressure plenum a flow of ambient air through the emissions collection means from the region located above the upwardly facing seal surface so as to entrain in said flow of ambient air such gaseous emissions as may emanate from the workstation location from among contents discharged from aerosol cans that are punctured at the workstation.

2. The method of claim 1 wherein the step of providing structure for defining a workstation includes the step of providing centering means for engaging and guiding the bottom end region of an upright-oriented aerosol spray can that is being moved toward the workstation location so as to center the bottom end region about said center axis as said bottom end region is moved into the workstation location, and the step of positioning aerosol spray cans, one at a time, so as to be received and centered about said center axis at the workstation location includes the step of utilizing said centering means to engage and guide the bottom end region of each aerosol can that is being moved toward and positioned at the workstation location.

3. The method of claim 2 wherein the step of providing centering means includes the step of providing a plurality of interchangeable centering rings that each define a tapered wall interior surface that is configured to guide and center a different diameter of aerosol can that is being moved toward and positioned at the workstation location, and the step of utilizing said centering means includes the step of selecting an appropriate one of the interchangeable centering rings for use with each diameter of aerosol can that is to be moved toward and positioned at the workstation location, and installing the selected interchangeable centering rings at the workstation to engage and guide each of the correspondingly different diameter aerosol cans into position at the workstation.

4. The method of claim 1 wherein the step of providing clamping means at a location along said center axis that is spaced above and overlies said workstation location for engaging upper end portions of each aerosol spray can that is received at the workstation location for exerting downwardly directed force on each such received can to clamp the received can in position at the workstation location includes the step of providing a clamping member that is movable toward and away from a clamping location along said center axis wherein the clamping member engages upper end portions of an aerosol spray can that is received at the workstation location, and the step of operating the clamping means to clamp each spray can that is positioned at the workstation location so that peripheral portions of the bottom walls of each such can are held in firmly sealed engagement with the upwardly facing seal surface includes the step of moving the clamping member toward said clamping position at a time after each such aerosol can is positioned at the workstation location, and at a time before the clamping member is used to exert downwardly directed force on such aerosol can.

5. The method of claim 4 wherein the step of providing a clamping member that is movable toward and away from a clamping location along said center axis wherein the clamping member engages upper end portions of an aerosol spray can that is received at the workstation location includes the step of providing a sleeve-shaped clamping member that has arcuate-shaped bottom surface portions that are configured to engage upper end portions of an aerosol spray can that is received at the workstation location, and the step of moving the clamping member toward said clamping position to engage and apply downwardly directed force to upper end portions of an aerosol can that is positioned at the workstation location includes the step of moving said arcuate-shaped bottom surface portions of the clamping member into engagement with said upper end portions and pressing said arcuate-shaped bottom surface portions downwardly so as to apply downwardly-directed force to said upper end portions.

6. The method of claim 5 wherein the step of providing a sleeve-shaped clamping member includes the step of providing pivotally movable, hand-operable lever means that is connected to the sleeve-shaped clamping member for moving said sleeve-shaped clamping member toward and away from said clamping position, and the step of moving the clamping member toward said clamping position to engage and apply downwardly directed force to the upper end portions of an aerosol can that is positioned at the workstation location includes the step of pivoting said hand-operable lever means to effect such movement of the clamping member.

7. The method of claim 1 wherein the step of providing puncturing means that is operable to extend a pointed piercing pin upwardly along said center axis and through the center opening from a retracted position located beneath the upwardly facing seal surface to an extended position located above said upwardly facing seal surface to puncture the bottom wall of each aerosol spray can that is received and clamped in position at said workstation location, and to retract the pointed piercing pin along said center axis to said retracted position after effecting each such puncture, includes the step of providing hand-operable, pivotally movable lever means that is connected to the pointed piercing pin and is operable when pivoted in one direction to extend said piercing pin upwardly along the center axis, and when pivoted in the opposite direction to retrace the piercing pin downwardly along said center axis, and the step of operating the puncturing means includes the step of pivoting the hand-operable lever means in said one direction to extend the piercing pin to effect said puncture, and thence to pivot the hand-operable lever means in said opposite direction to retract the piercing pin.

8. The method of claim 7 wherein the step of providing puncturing means that is operable to extend a pointed piercing pin upwardly along said center axis and through the center opening from a retracted position located beneath the upwardly facing seal surface to an extended position located above said upwardly facing seal surface to puncture the bottom wall of each aerosol spray can that is received and clamped in position at said workstation location, and to retract the pointed piercing pin along said center axis to said retracted position after effecting each such puncture, includes the steps of 1) providing includes the step of providing a toothed rack that is connected to the piercing pin for movement along said center axis with the piercing pin, and 2) providing a toothed gear that is connected to the hand-operable lever means for pivotal movement therewith, that has a toothed gear surface that drivingly engages the toothed rack to cause the rack to move along said center axis in response to pivotal movement of the toothed gear, and the step of operating the puncturing means includes the steps of 1) pivoting the hand-operable lever means in said one direction to rotate the toothed gear to cause the toothed rack and the piercing pin to move along the center axis to extend the piercing pin to effect said puncture, 2) pivoting the hand-operable lever means in said opposite direction to cause the toothed rack and the piercing pin to move along the center axis to retract the piercing pin.

9. The method of claim 1 wherein the step of providing discharge passage means for receiving contents that discharge through the center opening from aerosol spray cans that are positioned, clamped and punctured one at a time at the workstation location for ducting such contents into a receiving container includes the steps of providing structure for defining a discharge passage that extends 1) from one end region of the discharge passage that communicates with the center opening of the annular seal to a central region that surrounds the piercing pin when the piercing pin is in its retracted position, and 2) from the central region that surrounds the piercing pin to an opposite end region of the discharge passage that communicates with said upper region of the receiving container, and the step of ducting contents discharged from each punctured can through the discharge passage means into the receiving container includes directing such discharged contents into the one end region and thence through said central region for discharge into the upper region of the receiving container by passing through the opposite end region of the discharge passage.

10. The method of claim 9 additionally including the steps of providing pressure responsive indicator means that communicates with said discharge passage for providing a visual indication to an operator when the sensed pressure of discharged contents within the discharge passage exceeds ambient air pressure, and the step of applying downwardly directed force to clamp an aerosol can against the annular seal is not discontinued at a time when a visual indication is being provided to an operator of the sensing of higher than ambient air pressure within said discharge passage.

11. The method of claim 1 wherein the step of providing filtering means for communicating with upper region of the receiving container includes the step of providing a screen filter located in a passage that extends upwardly from the upper region of the upper region of the receiving container and through which gaseous contents that are ducted from the upper region of the receiving container to the filtering means must travel, and the step of filtering environmentally objectionable constituents from gaseous contents that are ducted from the upper region of the receiving container includes the step of using the screen filter to extract at least some liquid droplets from gaseous contents that are ducted through the screen filter, with the extracted liquid droplets being permitted to fall under the influence of gravity from the screen filter into the lower region of the receiving container where liquid contents discharged from punctured aerosol cans are collected.

12. The method of claim 11 wherein the step of using the screen filter includes the step of periodically removing the screen filter from its location in said passage, and cleaning the screen filter of deposits that may have accumulated thereon during passage of gaseous contents therethrough.

13. The method of claim 1 wherein the step of providing filtering means includes providing at least one commercially available filter unit through which gaseous contents that are withdrawn from the upper region of the receiving container must pass to remove environmentally objectionable constituents therefrom before the filtered gas is released to atmosphere.

14. The method of claim 1 wherein the step of providing reduced pressure plenum means includes the step of providing a relatively large diameter flexible hose that is connected to blower means that is operable to draw gaseous contents from the flexible hose to maintain the gaseous contents that are contained within the flexible hose at a pressure that is less than that of ambient air, and the step of ducting filtered gas from the filter means into the reduced pressure plenum for discharge to atmosphere is effected by ducting filtered gas into the flexible hose while the blower means is being operated.

15. The method of claim 14 wherein the blower means is operable to maintain the pressure of gaseous contents within the flexible hose at a pressure of about five pounds per square inch less than that of ambient air pressure, and the step of ducting gaseous contents discharged from punctured aerosol cans through filter means is effected, at least in part, by utilizing the reduced pressure within the flexible hose to draw gaseous contents from the upper region of the receiving container through the filter means.

16. The method of claim 1 wherein the step of providing emissions collection means adjacent the workstation location for ducting a flow of ambient air from the region located above the upwardly facing seal surface includes the steps of providing a wide-mouthed funnel-shaped collector that extends about at least a portion of the perimeter of the resilient seal at a location above the upwardly facing seal surface, and providing a flexible hose that extends from the wide-mouthed collector to the reduced pressure plenum for ducting a flow of ambient air that is drawn through the wide-mouthed collector into the reduced pressure plenum.

17. A method for puncturing aerosol spray cans and treating contents discharged therefrom, comprising the steps of:
  a) positioning aerosol spray cans, one at a time, so as to be 1) received at a workstation location and 2) centered about a center axis that extends vertically through the workstation location;
  b) clamping each spray can that is received and centered at the workstation location to press peripheral portions of the can's bottom wall into firm sealing engagement with an upwardly facing annular seal surface that is defined by a resilient annular seal that underlies each can that is received and is centered at the workstation location;
  c) puncturing each aerosol can that is received, centered and clamped at the workstation location by extending a piercing pin along said center axis to puncture the bottom walls of such received, centered and clamped cans, and to thereby cause contents of each punctured can to discharge through a center opening that is defined by the annular seal;
  d) ducting contents discharged through said center opening from aerosol cans that are punctured at the workstation location through a discharge passage into an upper region of a receiving container;
  e) collecting liquid contents that are discharged into the receiving container in a lower region of the receiving container for eventual disposal in accordance with environmentally acceptable guidelines;
  f) drawing gaseous contents from the upper region of the receiving container through means for filtering environmentally objectionable constituents therefrom;
  g) ducting filtered gas from the filtering means into the reduced pressure plenum;
  h) drawing into the reduced pressure plenum a flow of ambient air from a region located above the upwardly facing seal surface so as to entrain in said flow of ambient air such gaseous emissions as may emanate from the workstation location from among contents discharged from aerosol cans that are punctured at the workstation; and,
  i) exhausting gaseous contents of the reduced pressure plenum to atmosphere while maintaining a pressure of gaseous contents within the plenum that is at a pressure which is lower than ambient air pressure.

18. The method of claim 17 wherein the step of centering aerosol cans one at a time at the workstation location includes the step of selecting a centering ring from among a plurality of interchangeable centering rings that are installable one at a time at a centering ring location that extends adjacent peripheral portions of the upwardly facing annular surface of the annular seal, with the selected centering ring having an inner diameter surface that will loosely but closely receive the outer diameter of the lower end region of an aerosol can that is next to be positioned at the workstation location selection, and with the selected centering ring being installed at the centering ring location before said next-to-be-positioned aerosol can is moved into the workstation location so as to utilize the inner diameter surface of the installed selected centering ring to assist in centering said next-to-be-positioned aerosol can during its movement into the workstation location.

19. The method of claim 18 additionally including the steps of 1) providing said plurality of interchangeable centering rings with each of the provided rings has an inner surface that is at least partially tapered, with the minimum diameter of each of the tapered inner surfaces corresponding to a different diameter of aerosol can that is to be received and centered at the workstation location, and 2) installing an appropriate one of the interchangeable centering rings at the centering ring location when a next-to-be-positioned aerosol can differs in diameter from the aerosol can that previously was received, centered, clamped and pierced at the workstation location.

20. The method of claim 17 wherein the step of clamping each spray can that is received and centered at the workstation location includes the steps of 1) bringing a sleeve-shaped clamping member into engagement with upper end portions of each such received and centered can, and 2) pressing the engaged clamping member downwardly apply downwardly directed force to an engaged can to press peripheral portions of the can's bottom wall into firm sealing engagement with the upwardly facing annular seal surface.

21. The method of claim 20 wherein the steps of bringing a sleeve-shaped clamping member into engagement, and of pressing the engaged clamping member downwardly are effected by utilizing a pivotally movable, hand-operable lever to which the sleeve-shaped clamping member is connected for moving toward and away from a received and centered can.

22. The method of claim 17 wherein the step of puncturing each aerosol can that is received, centered and clamped at the workstation location is effected by utilizing a pivotally movable, hand-operable lever to which the piercing pin is drivingly connected to extend the piercing pin along said center axis to puncture the bottom walls of such received, centered and clamped cans, and to retract the piercing pin from puncturing engagement with each newly punctured can.

23. The method of claim 17 additionally including the steps of providing pressure responsive indicator means that communicates with said discharge passage for providing a visual indication to an operator when the sensed pressure of discharged contents within the discharge passage exceeds ambient air pressure, and the step of applying downwardly directed force to clamp an aerosol can against the annular seal is not discontinued at a time when a visual indication is being provided to an operator of the sensing of higher than ambient air pressure within said discharge passage.

24. The method of claim 17 wherein the step of drawing gaseous contents from the upper region of the receiving container through means for filtering environmentally objectionable constituents therefrom includes the step of drawing said gaseous contents through a screen filter that is located in a passage that extends upwardly from the upper region of the upper region of the receiving container to utilize screen filter to extract at least some liquid droplets from such gaseous contents.

25. The method of claim 17 wherein the step of drawing gaseous contents from the upper region of the receiving container through means for filtering environmentally objectionable constituents therefrom includes the step of drawing said gaseous contents through at least one commercially available filter unit that contains at least one commercially available filter that is selected to be capable of removing environmentally objectionable constituents from gas that is drawn therethrough.

26. The method of claim 17 wherein the step of drawing gaseous contents from the upper region of the receiving container through means for filtering environmentally objectionable constituents therefrom includes the step of utilizing the less-than-ambient-air-pressure plenum to at least assist in drawing gaseous contents from the upper region of the receiving container through the filtering means.

27. The method of claim 17 wherein the step of drawing into the reduced pressure plenum a flow of ambient air from a region located above the upwardly facing seal surface includes the step of utilizing the less-than-ambient-air-pressure plenum to at least assist in drawing said flow of ambient air from said region.

28. The method of claim 17 wherein the step of exhausting gaseous contents of the reduced pressure plenum to atmosphere while maintaining a pressure of gaseous contents within the plenum that is at a pressure which is lower than ambient air pressure is effected by operating blower means that communicates with the plenum to draw gaseous contents from the plenum for exhausting such contents to the atmosphere, with the operation of the blower being controlled to maintain a pressure of gaseous contents within the plenum that is about five pounds per square inch less than the pressure of ambient air.

29. The method of claim 17 additionally including the step of utilizing a length of relatively large diameter flexible hose to define at least a portion of the reduced pressure plenum, with one end region of the length of flexible hose being connected to the means for filtering to draw filtered gas therefrom into the reduced pressure plenum, and with an opposite end region of the length of flexible hose being connected to blower means for drawing gaseous contents from the reduced pressure plenum to maintain the gaseous contents within the reduced pressure plenum at said less than ambient air pressure 30. Apparatus for puncturing aerosol spray cans and treating contents discharged therefrom, comprising:
 a) workstation means including a resilient annular seal having an upwardly facing surface, and structure extending about the periphery of the annular seal for cooperating with the annular seal to define a workstation location wherein aerosol spray cans can be received one at a time and centered about a center axis that extends substantially vertically through a center opening of the annular seal and through the workstation location, with peripheral portions of the bottom wall of each received and centered can resting atop the upwardly facing surface of the annular seal;

b) clamping means for clamping each spray can that is received and centered at the workstation location to press peripheral portions of the clamped can's bottom wall into firm sealing engagement with the upwardly facing surface of the annular seal;

c) piercing means for puncturing a hole in the bottom wall of each aerosol can that is received, centered and clamped at the workstation location by extending a piercing pin along said center axis to effect such puncture and to thereby cause contents of each punctured can to discharge through the center opening of the annular seal;

d) discharge passage means for ducting contents from pierced cans that are discharged through said center opening away from said center opening;

e) receiving means including a receiving container that is connected to the discharge passage means to receive contents from pierced cans that are ducted away from said center opening by said discharge passage means, with the receiving container having a lower portion for collecting liquid contents from the discharge passage means, and having an upper portion into which gaseous contents from the discharge passage means are ducted;

f) withdrawal passage means for ducting gaseous contents from the upper region of the receiving container;

g) filtering means connected to the withdrawal passage means for receiving gaseous contents that are ducted by the withdrawal passage means from the upper region of the receiving container, and for filtering environmentally objectionable constituents therefrom;

g) plenum means for defining a plenum that is connected to the filtering means for receiving filtered gas from the filtering means;

h) blower means connected to the plenum means for maintaining gaseous contents within the plenum at a pressure that is lower than ambient air pressure, and for withdrawing gaseous contents from the plenum to so maintain said lower than ambient air pressure therein; and, i) collection means including a wide-mouthed funnel-shaped collector that is positioned above the upwardly facing surface of the resilient seal at the workstation location to draw a flow of ambient air from a region located above the upwardly facing seal surface so as to entrain in said flow of ambient air such gaseous emissions as may emanate from the workstation location from among contents discharged from aerosol cans that are punctured at the workstation.

31. The apparatus of claim 30 wherein the workstation means additionally includes structure underlying the resilient seal for supporting the resilient seal, with said underlying structure being connected to said structure that extends about the periphery of the annular seal for cooperating with the annular seal to define said workstation location.

32. The apparatus of claim 31 wherein the structure that underlies the resilient seal and the structure that extends about the periphery of the annular seal are formed as integral parts of a single metal casting, with the structure that underlies the seal defining an upwardly facing shoulder atop which the annular seal is supported, and with the structure that extends about the periphery of the annular seal defining a generally cylindrical surface that extends upwardly from the upwardly facing shoulder.

33. The apparatus of claim 32 wherein a centering ring formed from brass is positioned atop peripheral portions of the upper surface of the annular seal, with the centering ring having a generally cylindrical outer surface that is of a diameter which will let the centering ring slip-fit within the upstanding generally cylindrical surface that is defined by the structure that extends about the periphery of the annular seal, whereby the centering ring is removably positioned atop said peripheral portions of the upper surface of the annular seal.

34. The apparatus of claim 33 wherein the centering ring that is removable positioned atop said peripheral portions of the upper surface of the annular seal is one of an interchangeable set of centering rings that each has a different inner diameter portion that is configured to extend loosely but closely about a different diameter of "standard sized" aerosol spray can, whereby a suitably sized centering ring can be selected and installed atop peripheral portions of the upper surface of the annular seal for cooperating with a next-to-be-punctured aerosol can to assist in centering such can at the workstation as the can is moved into the workstation location.

35. The apparatus of claim 34 wherein one of the centering rings is intended for use with an unusually small aerosol can that has a diameter that is less than the diameter of the center opening that is formed through the annular seal, and a metal washer and auxiliary annular seal that each have an inner diameter that is smaller than the diameter of said unusually small aerosol can are provided for use with said at least one centering ring, with the washer being configured to be positioned atop the upwardly facing surface of the annular seal, with the auxiliary annular seal being configured to be positioned atop the washer to define an annular resilient surface having peripheral portions atop which said one centering ring may be positioned, and inner annular surface portions that will serve to engage and support peripheral bottom wall portions of said unusually small aerosol can when said unusually small aerosol can is moved into the workstation location.

36. Apparatus for puncturing aerosol spray cans, one at a time to discharge contents therefrom, for collecting liquid contents that discharge from the punctured cans for environmentally appropriate disposal, and for filtering gaseous contents that discharge from the punctured cans to remove environmentally objectionable constituents therefrom before releasing the filtered gas to atmosphere, comprising:

a) workstation means including workstation structure for defining a workstation for receiving and guiding upright-oriented aerosol spray cans, one at a time, to a predetermined workstation location 1) wherein peripheral portions of the bottom end region of each received can are substantially centered about an imaginary vertical center axis that extends substantially centrally through the workstation, and 2) wherein peripheral portions of the bottom wall of each received can are centered and seated atop an annular resilient seal that forms a part of said structure and is positioned by said structure to present a upwardly facing seal surface that is substantially centered about said center axis and that extends substantially horizontally for engaging said peripheral portions of the bottom wall of each received can in a substantially contiguous ring-shaped region of engagement that encircles said center axis substantially concentrically at a location that surrounds a center opening that is defined by the annular resilient seal;

b) clamping means connected to the workstation structure and extending upwardly therefrom to a location along said center axis that is spaced above and overlies said workstation location for engaging upper end portions of each aerosol spray can that is received at the workstation location for exerting downwardly directed force on each such received can to clamp the received can in position at the workstation location, with said peripheral bottom wall portions of the clamped can being pressed into firm sealing engagement with said upwardly facing seal surface to form an uninterrupted ring-shaped seal between the seal surface and the bottom wall of the clamped can along said substantially contiguous ring-shaped region of engagement;

c) puncturing means connected to the workstation structure including a pointed piercing pin and means mounting the pointed piercing pin for movement relative to the workstation structure along said center axis through the center opening of the annular resilient seal between a retracted position located beneath the upwardly facing seal surface and an extended position located above the upwardly facing seal surface, with the piercing pin being operable when in said extended position to puncture the bottom wall of an aerosol spray can that is received and clamped in position at said workstation location, and being operable when in said retracted position to refrain from obstructing neither the positioning and centering of aerosol spray cans in the workstation location nor the removal of pierced aerosol spray cans from the workstation location, with the puncturing of a received, centered and clamped aerosol spray can at the workstation location by the piercing pin being operative to cause contents from the punctured can to discharge through the center opening of the annular resilient seal;

d) discharge passage means for defining a discharge passage that communicates with the center opening of the annular resilient seal for receiving contents that discharge through the center opening from aerosol spray cans that are positioned, clamped and punctured one at a time at the workstation location, and for ducting such received contents into a chamber that is defined by a receiving container, with said chamber having a lower region wherein discharged liquid contents discharged from punctured aerosol spray cans are collected for environmentally appropriate disposal, and having an upper region into which discharged gaseous contents discharged from punctured aerosol spray cans are ducted;

e) filtering means connected to the receiving container structure and communicating with upper region of the receiving container for ducting gaseous contents from the upper region through filter means for removing environmentally objectionable constituents therefrom;

f) reduced pressure plenum means having structure for defining a reduced pressure plenum and for maintaining gaseous contents within the plenum at a pressure that is less than ambient atmospheric pressure, having conduit means connected to the filtering means for ducting filtered gas from the filter means to the reduced pressure plenum, and having emissions collection means connected to the workstation structure for ducting a flow of ambient air from the region located above the upwardly facing seal surface and into the reduced pressure plenum so that, if gaseous emissions from contents that are discharged from aerosol spray cans at the workstation location should rise from the workstation location, such emissions will be entrained in said flow of ambient air that is ducted into the reduced pressure plenum for discharge with other gaseous contents of the reduced pressure plenum to the atmosphere.

37. The apparatus of claim 36 wherein the workstation structure includes centering means for engaging and guiding the bottom end region of an upright-oriented aerosol spray can that is being moved toward and into the workstation location so as to center said bottom end region about said center axis as said bottom end region arrives at the workstation location.

38. The apparatus of claim 37 wherein the centering means includes a plurality of interchangeable centering rings that each define a tapered wall interior surface that is configured to guide and center a different diameter of aerosol can that is to be moved toward and positioned in the workstation location.

39. The apparatus of claim 36 wherein the clamping means includes a clamping member and means for supporting the clamping member 1) for movement toward and away from a clamping location along said center axis wherein the clamping member engages upper end portions of an aerosol spray can that is received and centered at the workstation location, and 2) for utilizing the clamping member to clamp each such engaged aerosol spray can by applying downward force to engaged upper end portions of each such engaged aerosol spray can to press peripheral portions of the bottom wall of each such engaged aerosol spray can into firmly sealed engagement with the upwardly facing seal surface.

40. The apparatus of claim 39 wherein the clamping member includes sleeve-shaped means having arcuate-shaped bottom surface portions that are configured to engage upper end portions of an aerosol spray can that is received and centered at the workstation location 41. The apparatus of claim 40 wherein the means for supporting the clamping member includes pivotally movable, hand-operable lever means that is connected to the sleeve-shaped clamping means for moving the sleeve-shaped clamping means toward and away from said clamping position.

42. The apparatus of claim 36 wherein the means for mounting the pointed piercing pin for movement includes hand-operable, pivotally movable lever means that is connected to the pointed piercing pin and is operable when pivoted in one direction to extend said piercing pin upwardly along the center axis, and when pivoted in the opposite direction to retract the piercing pin downwardly along said center axis.

43. The apparatus of claim 42 wherein the means for mounting the pointed piercing pin for movement includes rack and pinion means for drivingly interconnecting the hand-operable, pivotally movable lever means to the extensible-retractable piercing pin, including a toothed rack that is connected to the piercing pin for movement along said center axis with the piercing pin, and a toothed gear 1) that is connected to the hand-operable lever means for pivotal movement therewith, and 2) that defines a toothed gear surface that drivingly engages the toothed rack to cause the rack to move along said center axis in response to pivotal movement of the toothed gear, with said rack and pinion means being operable to extend the piercing pin upwardly along the center axis when the lever means is pivoted in said one direction, and to retract the piercing pin downwardly along the center axis when the lever means is pivoted in said opposite direction.

44. The apparatus of claim 36 wherein the discharge passage extends 1) from a location where the discharge passage communicates with the center opening of the annular seal to a central region that surrounds the piercing pin when the piercing pin is in its retracted position, and 2) from the central region that surrounds the piercing pin to a location wherein the discharge passage communicates with said upper region of the receiving container.

45. The apparatus of claim 44 additionally including pressure responsive indicator means connected to the workstation structure and communicating with the discharge passage for providing a visual indication to an operator when the sensed pressure of discharged contents within the discharge passage exceeds ambient air pressure.

46. The apparatus of claim 36 wherein the filtering means includes screen filter means configured to extend across a passage that extends upwardly from the upper region of the receiving container, through which passage gaseous contents from the upper region of the receiving container are ducted on the way to being introduced into the reduced pressure plenum.

47. The apparatus of claim 46 wherein the filtering means includes means for removably mounting the screen filter in said upwardly extending passage so that the screen filter can be removed from within said passage and cleaned of deposits that may have accumulated thereon during passage of gaseous contents therethrough.

48. The apparatus of claim 36 wherein the filtering means includes at least one commercially available filter unit through which gaseous contents that are withdrawn from the upper region of the receiving container are ducted for removal of environmentally objectionable constituents therefrom before the filtered gas is released to atmosphere.

49. The apparatus of claim 36 wherein the reduced pressure plenum means includes a relatively large diameter flexible hose connected to blower means that is operable to draw gaseous contents from the flexible hose to maintain the gaseous contents that are contained within the flexible hose at a pressure that is less than that of ambient air.

50. The apparatus of claim 49 wherein the blower means includes a commercially available blower that is selected to have a capability of maintain the pressure of gaseous contents within the flexible hose at a pressure that is about five pounds per square inch less than that of ambient air pressure.

51. The apparatus of claim 36 wherein the emissions collection means includes a wide-mouthed funnel-shaped collector that extends about at least a portion of the perimeter of the resilient seal at a location above the upwardly facing seal surface, and flexible hose means for extending from the wide-mouthed collector to the reduced pressure plenum for ducting a flow of ambient air that is drawn through the wide-mouthed collector into the reduced pressure plenum.

52. Apparatus for puncturing aerosol spray cans and treating contents discharged therefrom, comprising:
   a) workstation means for defining a workstation location and for receiving and centering upright-oriented aerosol spray cans, one at a time, at a workstation location, with the centered aerosol spray cans being centered about a vertical center axis that extends substantially centrally through the workstation location;
   b) clamping means for clamping each aerosol spray can that is received and centered at the workstation location to press peripheral portions of the can's bottom wall into firm sealing engagement with an upwardly facing annular seal surface that is defined by a resilient annular seal that underlies each can that is received and is centered at the workstation location;
   c) piercing means for puncturing each aerosol spray can that is received, centered and clamped at the workstation location by extending a piercing pin along said center axis to puncture the bottom walls of such received, centered and clamped cans, and to thereby cause contents of each punctured can to discharge through a center opening that is defined by the annular seal;
   d) discharge conduit means for ducting to receiving container means such contents are discharged from aerosol cans that are received, centered, clamped and punctured at the workstation location, with the receiving container means defining a receiving chamber having an upper region into which such contents are ducted, and a lower region wherein liquid contents are collected for environmentally appropriate disposal;
   f) filtering means for filtering gaseous contents that are discharged from aerosol cans that are received, centered, clamped and punctured at the workstation location;
   g) emissions collection means for defining an opening located adjacent the workstation location for receiving a flow of ambient air from the vicinity of the workstation location, with the flow of ambient air having entrained therein such gaseous emissions from contents that discharge from punctured aerosol cans as might otherwise escape from the workstation location into a surrounding workplace environment; and,
   h) reduced pressure plenum means for 1) defining a plenum chamber wherein gaseous contents are maintained at a pressure that is less than ambient air pressure, 2) for communicating with the filtering means to draw filtered gas therefrom into the plenum chamber, 3) for communicating with the emissions collection means for drawing said flow through said opening located adjacent the workstation location into the plenum chamber, and 4) for withdrawing gaseous contents from the plenum chamber for being vented to atmosphere.

53. The apparatus of claim 52 wherein the workstation means includes a centering ring that is selected from a plurality of interchangeable centering rings that are installable one at a time at the workstation location for overlying peripheral portions of the annular seal surface for defining an inner diameter surface that rings the workstation location to loosely but closely receive the outer diameter of the lower end region of an aerosol can that is next to be positioned at the workstation location.

54. The apparatus of claim 53 wherein the plurality of interchangeable centering rings includes centering rings that each has an inner surface that is at least partially tapered, with the minimum diameter of each of the tapered inner surfaces corresponding to a different diameter of aerosol can that is to be received and centered at the workstation location.

55. The apparatus of claim 52 wherein the clamping means includes a sleeve-shaped clamping member that is engageable with upper end portions of each aerosol spray can that is received and centered at the workstation location.

56. The apparatus of claim 55 wherein the means for movably mounting the clamping means includes pivotally movable hand operable lever means 1) for bringing the sleeve-shaped clamping member into engagement with upper end portions of each aerosol spray can that is received and centered at the workstation location, and 2) for applying downwardly directed force to engaged upper end portions of each such aerosol spray can to press peripheral portions of the can's bottom wall into firm sealing engagement with said upwardly facing annular seal surface.

57. The apparatus of claim 52 wherein the piercing means includes pivotally movable, hand-operable lever means that is operable when pivoted in one direction to extend the piercing pin along said center axis to puncture the bottom walls of aerosol cans that are received, centered and clamped at the workstation location, and that is operable when pivoted in an opposite direction to retract the piercing pin.

58. The apparatus of claim 52 additionally including pressure responsive indicator means communicating with said discharge passage for providing a visual indication to an operator when the sensed pressure of discharged contents within the discharge passage exceeds ambient air pressure.

59. The apparatus of claim 52 wherein the filtering means includes a screen filter that is located in a passage through which gaseous contents are drawn while being ducted from the receiving container to the reduced pressure plenum.

60. The apparatus of claim 52 wherein the filtering means includes at least one commercially available filtering unit through which gaseous contents are drawn while being ducted from the receiving container to the reduced pressure plenum, with the filtering unit being selected to have capability to filter environmentally objectionable constituents from gas that is drawn through said filtering unit.

61. The apparatus of claim 52 wherein the reduced pressure plenum means includes blower means that communicates with the plenum chamber for drawing gaseous contents from the plenum chamber and for exhausting such contents to the atmosphere, with the operation of the blower being controlled to maintain a pressure of gaseous contents within the plenum chamber that is about five pounds per square inch less than the pressure of ambient air.

* * * * *